(12) United States Patent
Park et al.

(10) Patent No.: US 12,141,409 B2
(45) Date of Patent: Nov. 12, 2024

(54) ELECTRONIC DEVICE INCLUDING DIGITIZER

(71) Applicant: Samsung Electronics Co., Ltd., Suwon-si (KR)

(72) Inventors: Myeongsil Park, Suwon-si (KR); Changbyung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/838,737

(22) Filed: Jun. 13, 2022

(65) Prior Publication Data
US 2023/0044193 A1 Feb. 9, 2023

Related U.S. Application Data

(63) Continuation of application No. PCT/KR2022/007830, filed on Jun. 2, 2022.

(30) Foreign Application Priority Data

Jul. 30, 2021 (KR) .................. 10-2021-0100841

(51) Int. Cl.
*G06F 3/046* (2006.01)
*G02F 1/1333* (2006.01)
(Continued)

(52) U.S. Cl.
CPC .......... *G06F 3/046* (2013.01); *G02F 1/13338* (2013.01); *G06F 1/1618* (2013.01);
(Continued)

(58) Field of Classification Search
CPC ............. G06F 3/0412; G06F 3/0446; G06F 2203/04111; G06F 3/0445; G06F 3/0448;
(Continued)

(56) References Cited

U.S. PATENT DOCUMENTS

2009/0211818 A1 8/2009 Kondo et al.
2012/0169642 A1 7/2012 Lee
(Continued)

FOREIGN PATENT DOCUMENTS

JP  2009-199318 A  9/2009
JP  2015-064749 A  4/2015
(Continued)

OTHER PUBLICATIONS

International Search Report dated Sep. 7, 2022, issued in International Patent Application No. PCT/KR2022/007830.

*Primary Examiner* — Dismery Mercedes
(74) *Attorney, Agent, or Firm* — Jefferson IP Law, LLP

(57) ABSTRACT

An electronic device is provided. The electronic device includes at least one housing, a display panel disposed to be visible at least in part from an outside in an inner space of the at least one housing, and a digitizer disposed under the display panel. The digitizer includes a dielectric sheet including a plurality of layers, a plurality of first conductive patterns disposed in a first layer of the dielectric sheet and arranged at a predetermined interval to have a length in a first direction, and a plurality of second conductive patterns disposed in a second layer of the dielectric sheet different from the first layer and arranged at a predetermined interval to have a length in a second direction different from the first direction. A thickness of the plurality of second conductive patterns may be thicker than that of the plurality of first conductive patterns.

17 Claims, 14 Drawing Sheets

(51) Int. Cl.
*G06F 1/16* (2006.01)
*G06F 3/0354* (2013.01)
*G06F 3/038* (2013.01)
*G06F 3/041* (2006.01)
*G06F 3/044* (2006.01)

(52) U.S. Cl.
CPC .......... *G06F 1/1641* (2013.01); *G06F 1/1647* (2013.01); *G06F 3/03545* (2013.01); *G06F 3/038* (2013.01); *G06F 3/0412* (2013.01); *G06F 3/04162* (2019.05); *G06F 3/0445* (2019.05); *G06F 3/04166* (2019.05); *G06F 3/0441* (2019.05); *G06F 2203/04102* (2013.01); *G06F 2203/04106* (2013.01); *G09G 2300/023* (2013.01); *G09G 2300/0426* (2013.01)

(58) Field of Classification Search
CPC ........ G06F 3/047; G06F 3/044; G06F 3/0416; G06F 3/046; G06F 2203/04102; G06F 2203/04106; G06F 3/04164; G06F 3/0441; G06F 1/1618; G06F 1/1641; G06F 1/1652; G06F 3/03545; G06F 3/04162; G06F 3/038; G06F 3/0442; G06F 1/1683; G06F 1/1647; G06F 1/1643; G06F 1/1681; G09G 2300/0426; G09G 3/3266; G09G 2380/02; G09G 2300/023; G02F 1/13338; G02F 1/1343
See application file for complete search history.

(56) References Cited

U.S. PATENT DOCUMENTS

| | | | |
|---|---|---|---|
| 2013/0120675 A1* | 5/2013 | Oh | G02B 30/25 |
| | | | 445/24 |
| 2014/0184560 A1* | 7/2014 | Adachi | G06F 3/0445 |
| | | | 345/174 |
| 2014/0240622 A1* | 8/2014 | Watazu | G06F 3/0446 |
| | | | 349/12 |
| 2014/0319550 A1* | 10/2014 | Yamazaki | H10K 59/87 |
| | | | 257/88 |
| 2015/0042909 A1* | 2/2015 | Sekiguchi | G06F 3/0443 |
| | | | 349/12 |
| 2015/0062028 A1* | 3/2015 | Go | G06F 1/1616 |
| | | | 345/173 |
| 2015/0103503 A1 | 4/2015 | Yamazaki et al. | |
| 2015/0122623 A1* | 5/2015 | Kim | H03K 17/9618 |
| | | | 200/5 R |
| 2015/0138139 A1* | 5/2015 | Tokuno | B29C 45/14467 |
| | | | 345/174 |
| 2015/0309613 A1* | 10/2015 | Morein | G06F 3/0412 |
| | | | 345/174 |
| 2015/0355490 A1* | 12/2015 | Kao | G02F 1/13338 |
| | | | 349/12 |
| 2016/0252999 A1* | 9/2016 | Yang | G06F 3/0446 |
| | | | 345/174 |
| 2016/0349558 A1 | 12/2016 | Shishido et al. | |
| 2018/0079933 A1* | 3/2018 | Shimizu | B32B 3/30 |
| 2018/0246608 A1* | 8/2018 | Huh | G06F 3/046 |
| 2018/0335679 A1* | 11/2018 | Hashimoto | G02F 1/13338 |
| 2018/0348935 A1* | 12/2018 | Kurasawa | G06F 3/046 |
| 2019/0129553 A1* | 5/2019 | Oh | G06F 1/1643 |
| 2019/0146619 A1* | 5/2019 | Kurasawa | G02F 1/13338 |
| | | | 345/173 |
| 2019/0163003 A1 | 5/2019 | Kim et al. | |
| 2019/0235665 A1 | 8/2019 | Kim et al. | |
| 2019/0267430 A1* | 8/2019 | Choi | H10K 59/8722 |
| 2020/0159293 A1* | 5/2020 | Seibert | G06F 1/1618 |
| 2020/0209998 A1* | 7/2020 | Shin | G06F 1/1641 |
| 2021/0175463 A1 | 6/2021 | Zhou et al. | |
| 2022/0035501 A1* | 2/2022 | Kobori | G06F 3/0446 |
| 2022/0066584 A1* | 3/2022 | Watanabe | G06F 3/046 |

FOREIGN PATENT DOCUMENTS

| | | |
|---|---|---|
| KR | 10-1371327 B1 | 3/2014 |
| KR | 10-2015-0103612 A | 9/2015 |
| KR | 10-2016-0140430 A | 12/2016 |
| KR | 10-1686892 B1 | 12/2016 |
| KR | 10-1750564 B1 | 6/2017 |
| KR | 10-2018-0013328 A | 2/2018 |
| KR | 10-2019-0047168 A | 5/2019 |
| KR | 10-2019-0103872 A | 9/2019 |
| KR | 10-2021-0016983 A | 2/2021 |
| KR | 10-2021-0052699 A | 5/2021 |
| WO | 2019-014825 A1 | 1/2019 |

* cited by examiner

ELECTRONIC DEVICE INCLUDING DIGITIZER

CROSS-REFERENCE TO RELATED APPLICATION(S)

This application is a continuation application, claiming priority under § 365(c), of an International application No. PCT/KR2022/007830, filed on Jun. 2, 2022, which is based on and claims the benefit of a Korean patent application number 10-2021-0100841, filed on Jul. 30, 2021, in the Korean Intellectual Property Office, the disclosure of which is incorporated by reference herein in its entirety.

TECHNICAL FIELD

The disclosure relates to an electronic device including a digitizer.

BACKGROUND ART

Electronic devices are gradually becoming slimmer, and are being improved to increase their rigidity, strengthen their design aspects, and differentiate their functional features. The electronic device is being developed to have various shapes, departing from a uniform rectangular shape. The electronic device may include a digitizer for detecting an input through an electronic pen (e.g., a stylus pen). For slimming, the electronic device may require an efficient arrangement structure and a stacking structure of a digitizer.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device (e.g., a portable communication device, a mobile terminal, a foldable electronic device, or a rollable electronic device) may include a digitizer disposed under a display panel. The digitizer may include a plurality of conductive patterns (e.g., a coil pattern or a coil member) spaced apart to form a loop at a predetermined interval. The digitizer may generate a magnetic field through a current inputted to the plurality of conductive patterns, and when an electronic pen having a coil member approaches the display panel, the coil member of the electronic pen may also generate a magnetic field. The magnetic field of the electronic pen may induce the plurality of conductive patterns of the digitizer to generate an induced electromotive force, and the digitizer may detect the position and strength of the induced electromotive force and thereby transmit electronic pen-related information such as the position and pen pressure of the electronic pen to a processor of the electronic device. Accordingly, based on the received electronic pen-related information, the electronic device (e.g., the processor) may control the display panel or perform a corresponding function of the electronic device.

Meanwhile, the digitizer may include a dielectric sheet and a plurality of conductive patterns disposed in different layers of the dielectric sheet. The plurality of conductive patterns may include a plurality of first conductive patterns disposed in a first layer, and a plurality of second conductive patterns disposed in a second layer different from the first layer and arranged to cross the plurality of first conductive patterns when the dielectric sheet is viewed from above. At least one plurality of conductive patterns of the plurality of first conductive patterns and the plurality of second conductive patterns may be used as Tx channels and/or Rx channels.

If the thickness of the conductive patterns is lowered to make the electronic device slimmer, a channel resistance increases and thus current consumption increases. If a driving current is lowered to moderate the current consumption, the signal strength decreases and thereby the detection performance of the digitizer may be deteriorated. Therefore, the thickness of the conductive patterns cannot be extremely reduced, which may be a cause of going against the slimming of the electronic device.

Aspects of the disclosure are to address at least the above-mentioned problems and/or disadvantages and to provide at least the advantages described below. Accordingly, an aspect of the disclosure is to provide an electronic device including a digitizer advantageous for slimming the electronic device.

Another aspect of the disclosure is to provide an electronic device including a digitizer having a reduced thickness while maintaining detection performance thereof.

Another aspect of the disclosure is to provide an electronic device including a digitizer having improved visibility so that traces of a plurality of conductive patterns are not visible from the outside of the display.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one housing, a display panel disposed to be visible at least in part from an outside in an inner space of the at least one housing, and a digitizer disposed under the display panel. The digitizer may include a dielectric sheet including a plurality of layers, a plurality of first conductive patterns disposed in a first layer of the dielectric sheet and arranged at a predetermined interval to have a length in a first direction, and a plurality of second conductive patterns disposed in a second layer of the dielectric sheet different from the first layer and arranged at a predetermined interval to have a length in a second direction different from the first direction. A thickness of the plurality of second conductive patterns may be greater than a thickness of the plurality of first conductive patterns.

In accordance with another aspect of the disclosure, a digitizer is provided. The digitizer includes a dielectric sheet including a plurality of layers, a plurality of first conductive patterns disposed in a first layer of the dielectric sheet and arranged at a predetermined interval to have a length in a first direction, and a plurality of second conductive patterns disposed in a second layer of the dielectric sheet different from the first layer and arranged at a predetermined interval to have a length in a second direction different from the first direction. A thickness of the plurality of second conductive patterns may be greater than a thickness of the plurality of first conductive patterns.

Advantageous Effects

In the digitizer according to embodiments of the disclosure, the thickness of a plurality of conductive patterns corresponding to Tx channels is formed to be relatively greater than the thickness of a plurality of conductive patterns corresponding to Rx channels to reduce the channel resistance, and this may help to slim the electronic device and improve detection performance. In addition, the digitizer is advantageous in improving visibility in which traces of the plurality of conductive patterns are not visible from the outside of the display.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
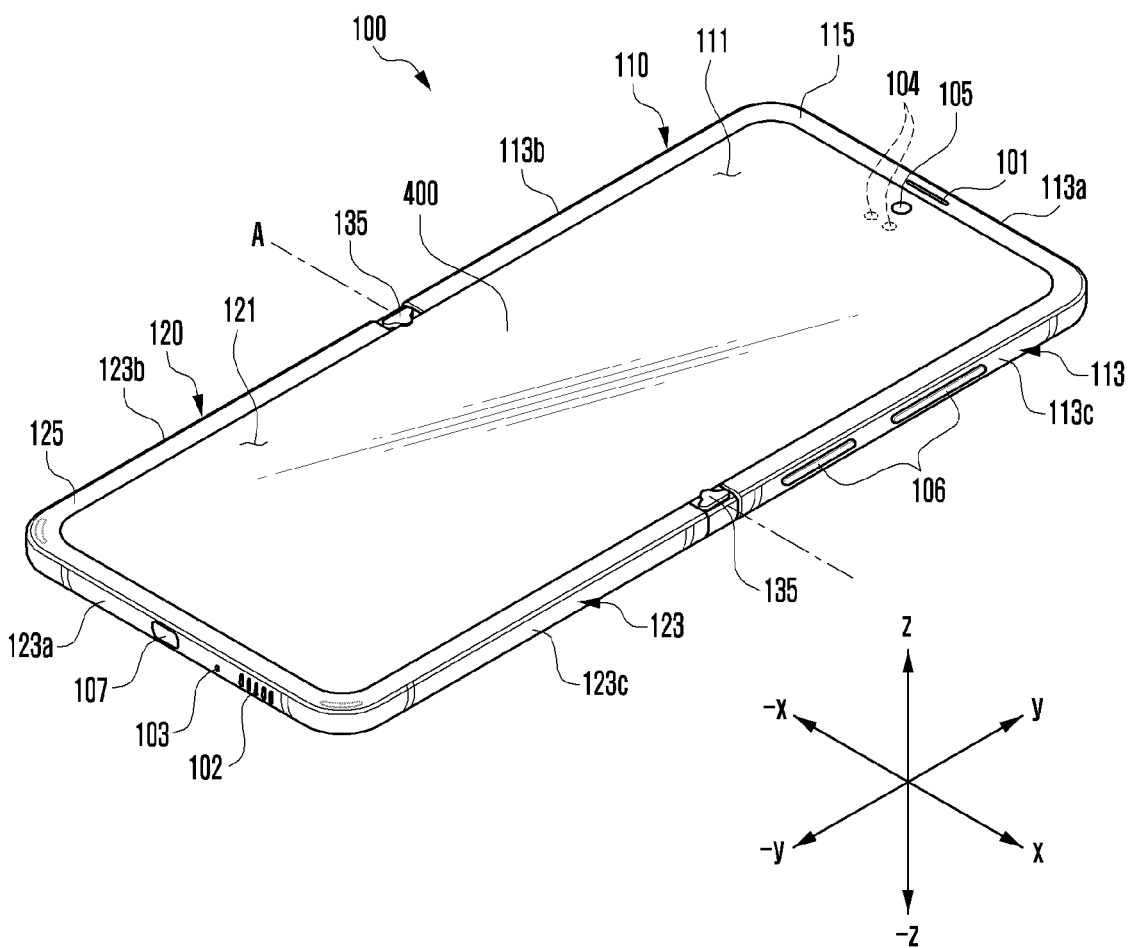
FIG. 1A is a front perspective view illustrating a flat state or an unfolding state of an electronic device according to an embodiment of the disclosure.

FIG. 1A is a front perspective view of an electronic device in a flat or unfolded state according to an embodiment of the disclosure.

Figure 1B:
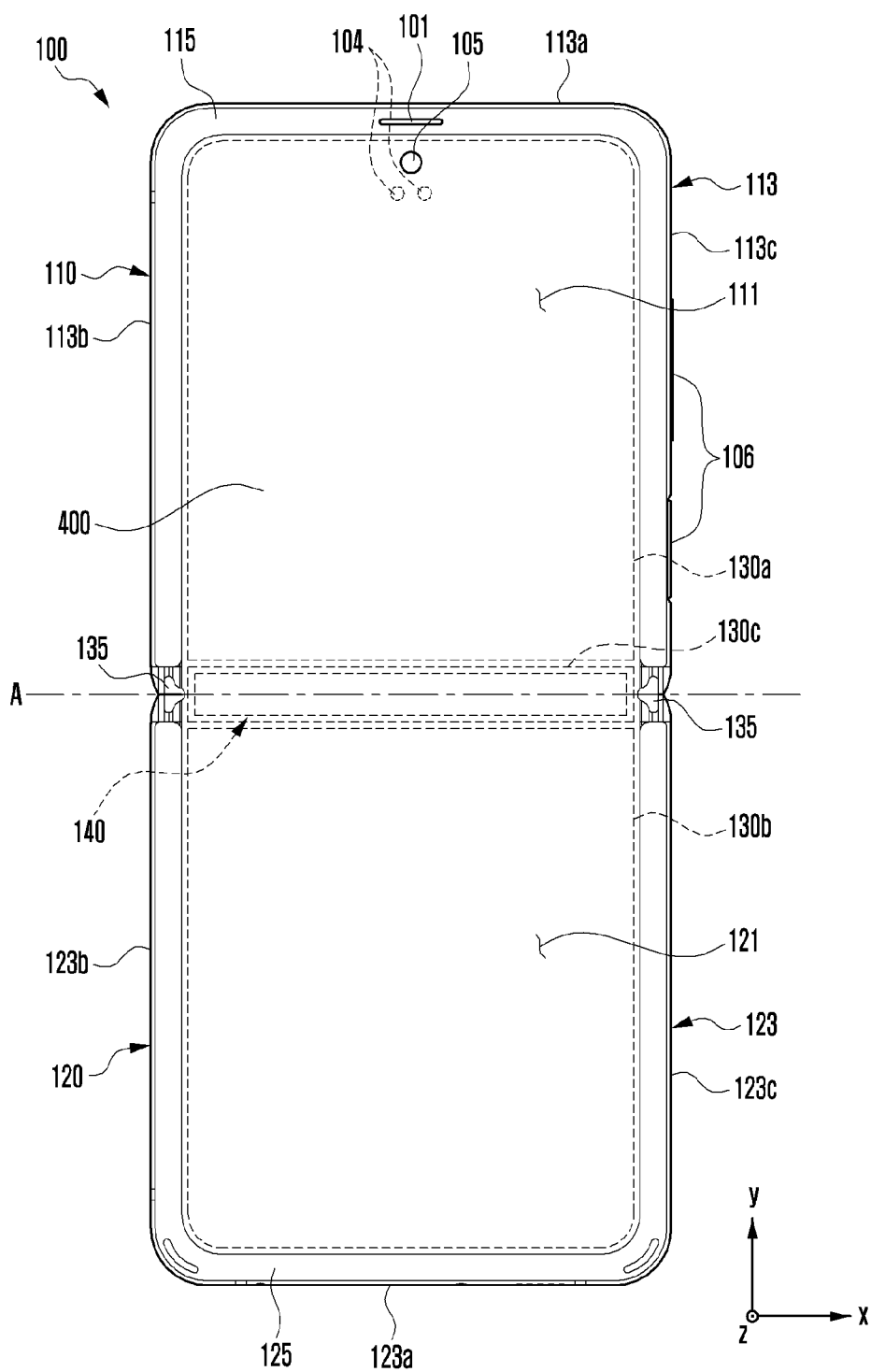
FIG. 1B is a plan view illustrating a front surface of an electronic device in an unfolding state according to an embodiment of the disclosure.

FIG. 1B is a plan view illustrating the front of the electronic device in an unfolded state according to an embodiment of the disclosure.

Figure 1C:
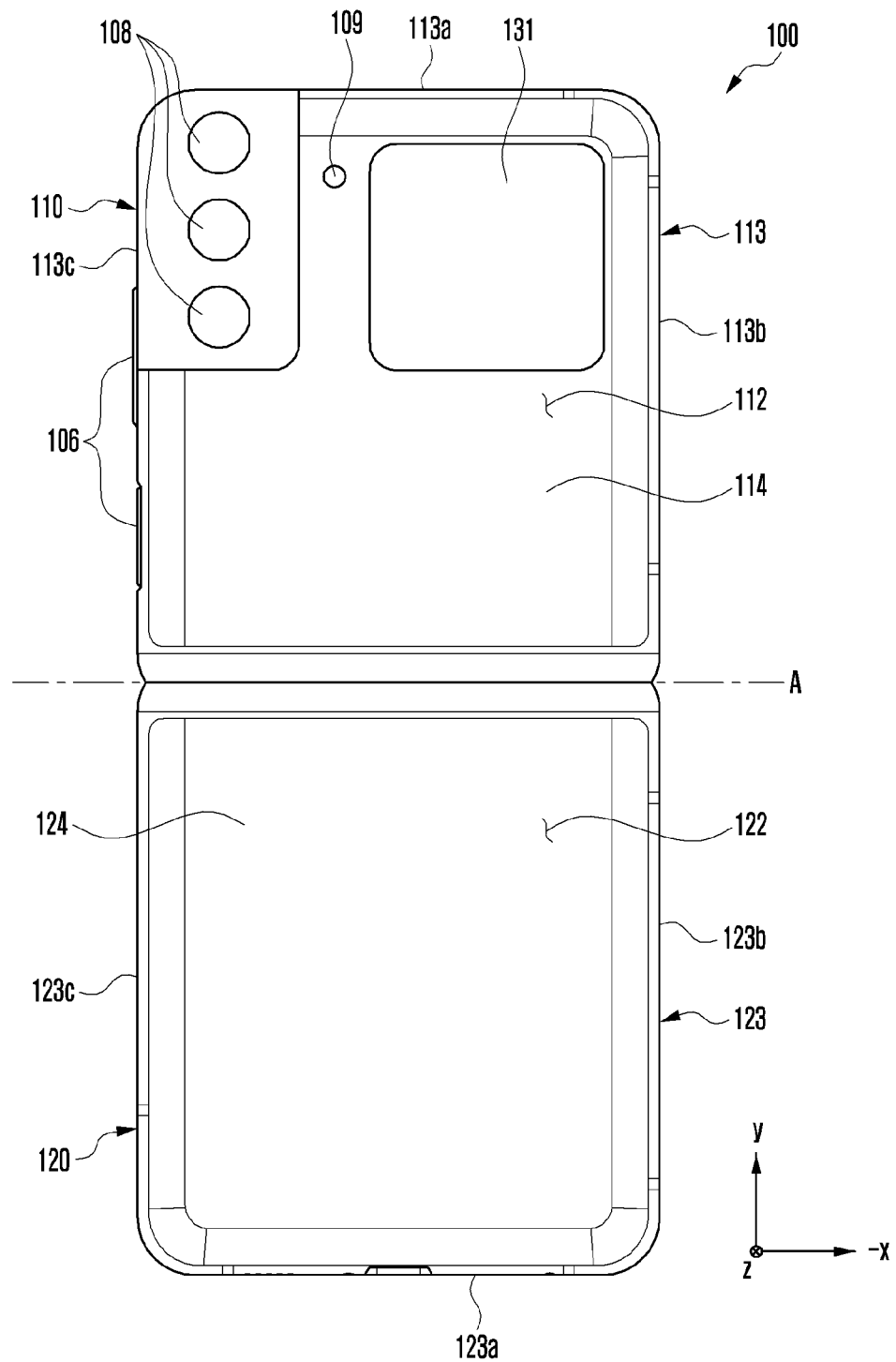
FIG. 1C is a plan view illustrating a rear surface of an electronic device in an unfolding state according to an embodiment of the disclosure.

FIG. 1C is a plan view illustrating the back of the electronic device in an unfolded state according to an embodiment of the disclosure.

Figure 2A:
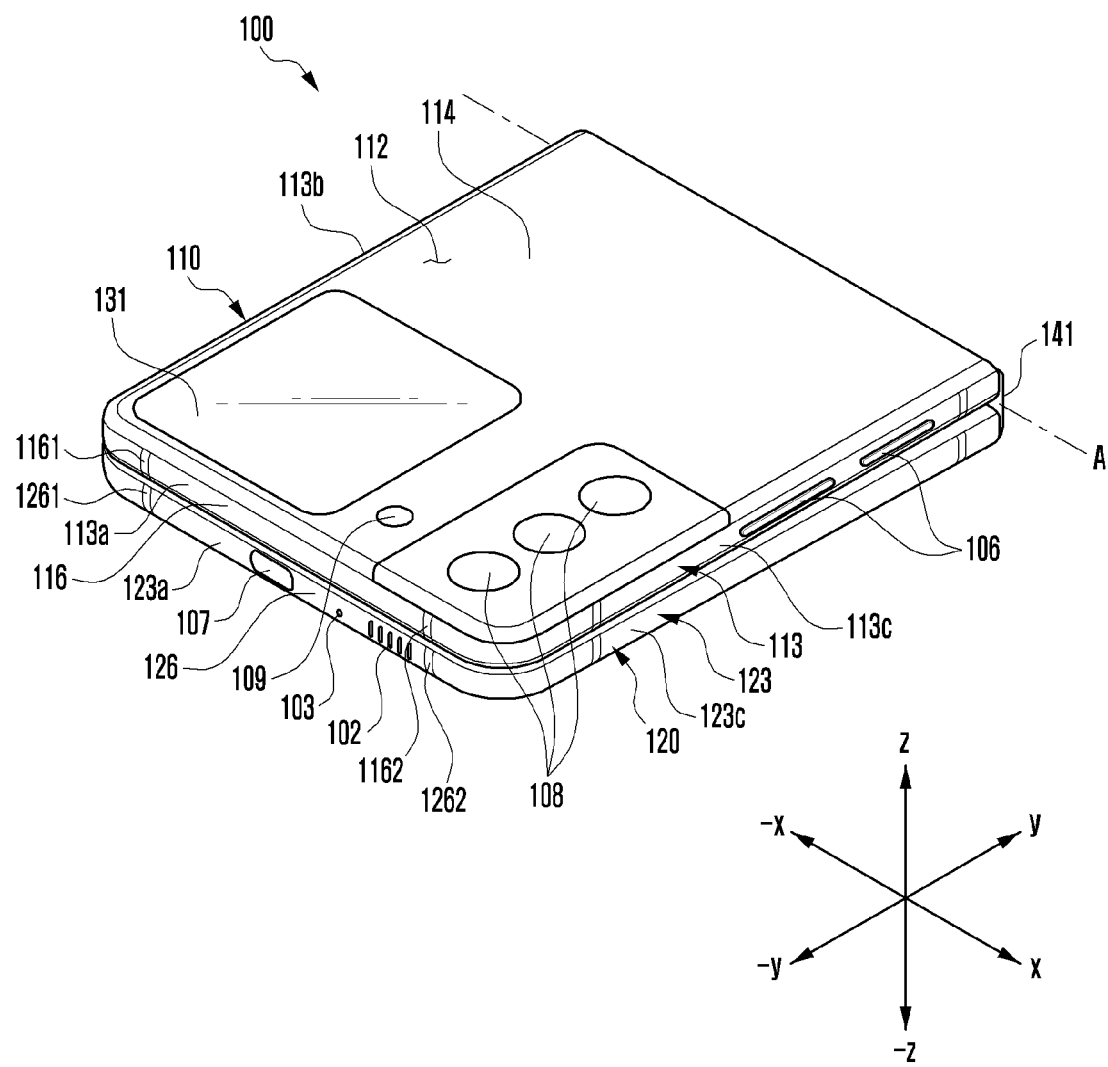
FIG. 2A is a perspective view illustrating a folding state of an electronic device according to an embodiment of the disclosure.

FIG. 2A is a perspective view of the electronic device in a folded state according to an embodiment of the disclosure.

Figure 2B:
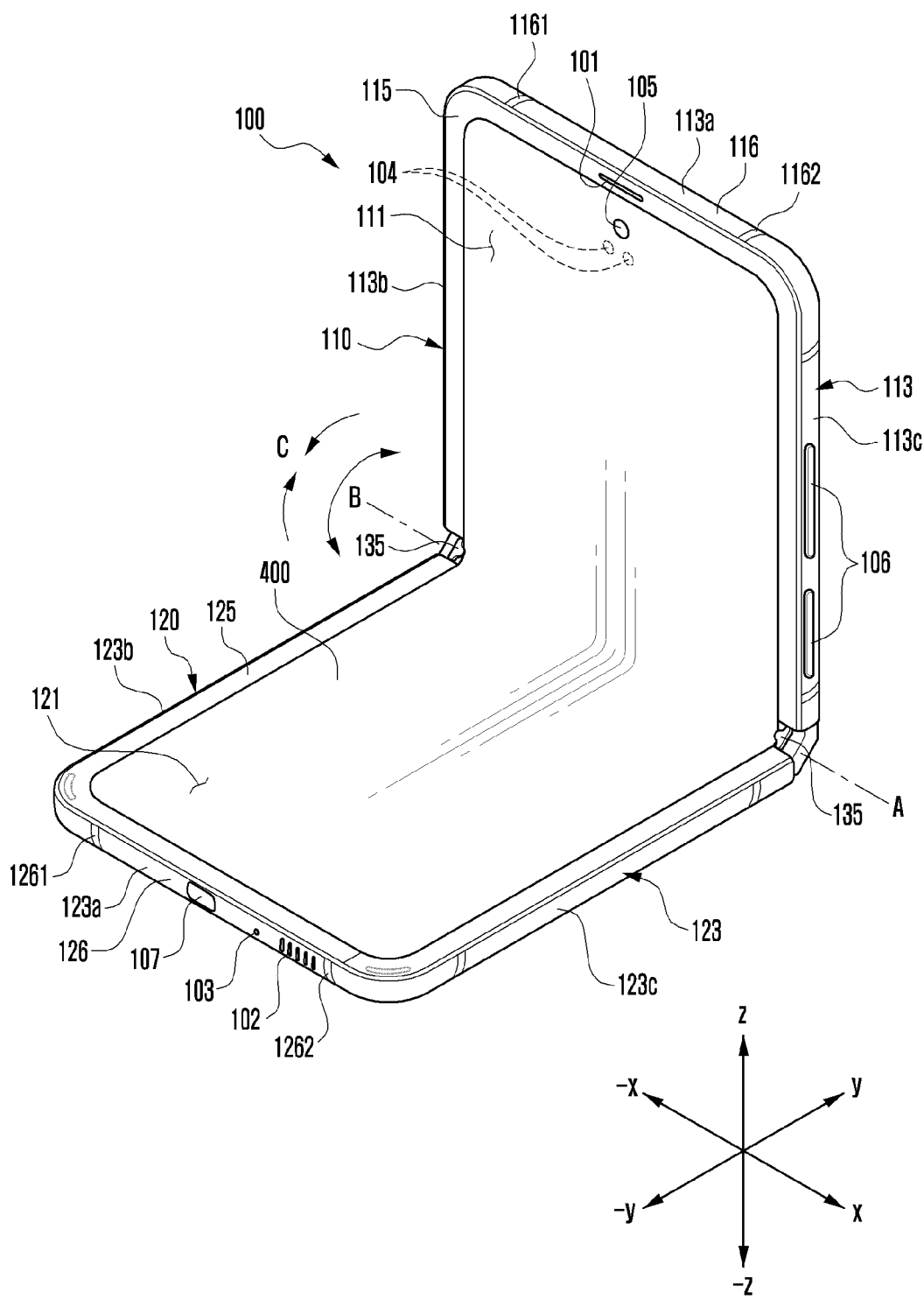
FIG. 2B is a perspective view illustrating an intermediate state of an electronic device according to an embodiment of the disclosure.

FIG. 2B is a perspective view of the electronic device in an intermediate state according to an embodiment of the disclosure.

Referring to FIGS. 1A, 1B, 1C, 2A, and 2B, the electronic device 100 may include a pair of housings 110 and 120 (e.g., foldable housings) that are rotatably coupled as to allow folding relative to a hinge mechanism (e.g., hinge mechanism 140 in FIG. 1B). In certain embodiments, the hinge mechanism (e.g., hinge mechanism 140 in FIG. 1B) may be disposed in the X-axis direction or in the Y-axis direction. In certain embodiments, two or more hinge mechanisms (e.g., hinge mechanism 140 in FIG. 1B) may be arranged to be folded in a same direction or in different directions. According to an embodiment, the electronic device 100 may include a flexible display 400 (e.g., foldable display) disposed in an area formed by the pair of housings 110 and 120. According to an embodiment, the first housing 110 and the second housing 120 may be disposed on both sides about the folding axis (axis A), and may have a substantially symmetrical shape with respect to the folding axis (axis A). According to an embodiment, the angle or distance between the first housing 110 and the second housing 120 may vary, depending on whether the state of the electronic device 100 is a flat or unfolded state, a folded state, or an intermediate state.

According to certain embodiments, the pair of housings 110 and 120 may include a first housing 110 (e.g., first housing structure) coupled to the hinge mechanism (e.g., hinge mechanism 140 in FIG. 1B), and a second housing 120 (e.g., second housing structure) coupled to the hinge mechanism (e.g., hinge mechanism 140 in FIG. 1B). According to an embodiment, in the unfolded state, the first housing 110 may include a first surface 111 facing a first direction (e.g., front direction) (z-axis direction), and a second surface 112 facing a second direction (e.g., rear direction) (negative z-axis direction) opposite to the first surface 111. According to an embodiment, in the unfolded state, the second housing 120 may include a third surface 121 facing the first direction (z-axis direction), and a fourth surface 122 facing the second direction (negative z-axis direction). According to an embodiment, the electronic device 100 may be operated in such a manner that the first surface 111 of the first housing 110 and the third surface 121 of the second housing 120 face substantially the same first direction (z-axis direction) in the unfolded state, and the first surface 111 and the third surface 121 face one another in the folded state. According to an embodiment, the electronic device 100 may be operated in such a manner that the second surface 112 of the first housing 110 and the fourth surface 122 of the second housing 120 face substantially the same second direction (negative z-axis direction) in the unfolded state, and the second surface 112 and the fourth surface 122 face one another in opposite directions in the folded state. For example, in the folded state, the second surface 112 may face the first direction (z-axis direction), and the fourth surface 122 may face the second direction (negative z-axis direction).

According to certain embodiments, the first housing 110 may include a first side member 113 that at least partially forms an external appearance of the electronic device 100, and a first rear cover 114 coupled to the first side member 113 that forms at least a portion of the second surface 112 of the electronic device 100. According to an embodiment, the first side member 113 may include a first side surface 113a, a second side surface 113b extending from one end of the first side surface 113a, and a third side surface 113c extending from the other end of the first side surface 113a. According to an embodiment, the first side member 113 may be formed in a rectangular shape (e.g., square or rectangle) through the first side surface 113a, second side surface 113b, and third side surface 113c.

According to certain embodiments, the second housing 120 may include a second side member 123 that at least partially forms the external appearance of the electronic device 100, and a second rear cover 124 coupled to the second side member 123, forming at least a portion of the fourth surface 122 of the electronic device 100. According to an embodiment, the second side member 123 may include a fourth side surface 123a, a fifth side surface 123b extending from one end of the fourth side surface 123a, and a sixth side surface 123c extending from the other end of the fourth side surface 123a. According to an embodiment, the second side member 123 may be formed in a rectangular shape through the fourth side surface 123a, fifth side surface 123b, and sixth side surface 123c.

According to certain embodiments, the pair of housings 110 and 120 are not limited to the shape and combinations illustrated herein, and may be implemented with a combination of other shapes or parts. For example, in certain embodiments, the first side member 113 may be integrally formed with the first rear cover 114, and the second side member 123 may be integrally formed with the second rear cover 124.

According to certain embodiments, in the unfolded state of the electronic device 100, the second side surface 113b of the first side member 113 and the fifth side surface 123b of the second side member 123 may be connected without a gap formed therebetween. According to an embodiment, in the unfolded state of the electronic device 100, the third side surface 113c of the first side member 113 and the sixth side surface 123c of the second side member 123 may be connected without a gap formed therebetween. According to an embodiment, in the unfolded state, the electronic device 100 may be configured such that the combined length of the second side surface 113b and the fifth side surface 123b is longer than the combined length of the first side surface 113a and/or the fourth side surface 123a. In addition, the combined length of the third side surface 113c and the sixth side surface 123c may be configured to be longer than the length of the first side surface 113a and/or the fourth side surface 123a.

According to certain embodiments, the first side member 113 and/or the second side member 123 may be formed of a metal, and may further include a polymer injected into the metal. According to an embodiment, the first side member 113 and/or the second side member 123 may include at least one conductive portion 116 and/or 126 electrically segmented through one or more segmenting portions 1161 and 1162 and/or segmenting 1261 and 1262, which may be formed using a polymer. In this case, the at least one conductive portion may be electrically connected to a wireless communication circuit included in the electronic device 100, and may be used as an antenna operating in at least one designated band (e.g., legacy band).

According to certain embodiments, the first rear cover 114 and/or the second rear cover 124 may be formed of, for example, coated or tinted glass, ceramic, polymer, metal (e.g., aluminum, stainless steel or "STS", or magnesium), or a combination thereof.

According to certain embodiments, the flexible display 400 may be disposed to extend from the first surface 111 of the first housing 110 across the hinge mechanism (e.g., hinge mechanism 140 in FIG. 1B) to at least a portion of the third surface 121 of the second housing 120. For example, the flexible display 400 may include a first region 130a substantially corresponding to the first surface 111, a second region 130b corresponding to the second surface 121, and a third region 130c (e.g., the bendable region) connecting the first region 130a and the second region 130b and corresponding to the hinge mechanism (e.g., hinge mechanism 140 in FIG. 1B). According to an embodiment, the electronic device 100 may include a first protection cover 115 (e.g., first protection frame or first decoration member) coupled along the periphery of the first housing 110. According to an embodiment, the electronic device 100 may include a second protection cover 125 (e.g., second protection frame or second decoration member) coupled along the periphery of the second housing 120. According to an embodiment, the first protection cover 115 and/or the second protection cover 125 may be formed of a metal or polymer material. According to an embodiment, the first protection cover 115 and/or the second protection cover 125 may be used as a decorative member. According to an embodiment, the flexible display 400 may be positioned such that the periphery of the first region 130a is interposed between the first housing 110 and the first protection cover 115. According to an embodiment, the flexible display 400 may be positioned such that the periphery of the second region 130b is interposed between the second housing 120 and the second protection cover 125. According to an embodiment, the flexible display 400 may be positioned such that the periphery of the flexible display 400 corresponding to a protection cap 135 is protected through the protection cap disposed in a region corresponding to the hinge mechanism (e.g., hinge mechanism 140 in FIG. 1B). Consequently, the periphery of the flexible display 400 may be substantially protected from the outside. According to an embodiment, the electronic device 100 may include a hinge housing 141 (e.g., hinge cover) that is disposed so as to support the hinge mechanism (e.g., hinge mechanism 140 in FIG. 1B). The hinge housing 141 may further be exposed to the outside when the electronic device 100 is in the folded state, and be invisible as viewed from the outside when retracted into a first space (e.g., internal space of the first housing 110) and a second space (e.g., internal space of the second housing 120) when the electronic device 100 is in the unfolded state. In certain embodiments, the flexible display 400 may be disposed to extend from at least a portion of the second surface 112 to at least a portion of the fourth surface 122. In this case, the electronic device 100 may be folded so that the flexible display 400 is exposed to the outside (out-folding scheme).

According to certain embodiments, the electronic device 100 may include a sub-display 131 disposed separately from the flexible display 400. According to an embodiment, the sub-display 131 may be disposed to be at least partially exposed on the second surface 112 of the first housing 110, and may display status information of the electronic device 100 in place of the display function of the flexible display 400 in case of the folded state. According to an embodiment, the sub-display 131 may be disposed to be visible from the outside through at least some region of the first rear cover 114. In certain embodiments, the sub-display 131 may be disposed on the fourth surface 122 of the second housing 120. In this case, the sub-display 131 may be disposed to be visible from the outside through at least some region of the second rear cover 124.

According to certain embodiments, the electronic device 100 may include at least one of an input device 103 (e.g., microphone), sound output devices 101 and 102, a sensor module 104, camera devices 105 and 108, a key input device 106, or a connector port 107. In the illustrated embodiment, the input device 103 (e.g., microphone), sound output devices 101 and 102, sensor module 104, camera devices 105 and 108, key input device 106, and connector port 107 indicate a hole or shape formed in the first housing 110 or the second housing 120, but may be defined to include a substantial electronic component (e.g., input device, sound output device, sensor module, or camera device) that is disposed inside the electronic device 100 and operated through a hole or a shape.

According to certain embodiments, the input device 103 may include at least one microphone disposed on the second housing 120. In certain embodiments, the input device 103 may include a plurality of microphones disposed to detect the direction of a sound. In certain embodiments, a plurality of microphones may be disposed at appropriate positions in the first housing 110 and/or the second housing 120. According to an embodiment, the sound output devices 101 and 102 may include speakers. According to an embodiment, the input device 103 may include a receiver for calls disposed in the first housing 110, and a speaker disposed in the second housing 120. In certain embodiments, the input device 103, the sound output devices 101 and 102, and the connector port 107 may be disposed in a space arranged in the first housing 110 and/or the second housing 120 of the electronic device 100, and may be exposed to the external environment through at least one hole formed in the first housing 110 and/or the second housing 120. According to an embodiment, at least one connector port 107 may be used to transmit and receive power and/or data to and from an external electronic device. In certain embodiments, at least one connector port (e.g., ear jack hole) may accommodate a connector (e.g., ear jack) for transmitting and receiving an audio signal to and from an external electronic device. In certain embodiments, the hole formed in the first housing 110 and/or the second housing 120 may be commonly used for the input device 103 and the sound output devices 101 and 102. In certain embodiments, the sound output devices 101 and 102 may include a speaker (e.g., piezo speaker) that operates without using a hole formed in the first housing 110 and/or the second housing 120.

According to certain embodiments, the sensor module 104 may generate an electrical signal or data value corresponding to an internal operating state of the electronic device 100 or an external environmental state. The sensor module 104 may detect an external environment, for example, through the first surface 111 of the first housing 110. In certain embodiments, the electronic device 100 may further include at least one sensor module disposed to detect an external environment through the second surface 112 of the first housing 110. According to an embodiment, the sensor module 104 (e.g., illuminance sensor) may be disposed under the flexible display 400 to detect an external environment through the flexible display 400. According to an embodiment, the sensor module 104 may include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, a proximity sensor, a biometric sensor, an ultrasonic sensor, or an illuminance sensor (i.e., sensor module 104).

According to certain embodiments, the camera devices 105 and 108 may include a first camera device 105 (e.g., front camera device) disposed on the first surface 111 of the first housing 110, and a second camera device 108 disposed on the second surface 112 of the first housing 110. The electronic device 100 may further include a flash 109 disposed close to the second camera device 108. According to an embodiment, the camera device 105 or 108 may include one or more lenses, an image sensor, and/or an image signal processor. The flash 109 may include, for example, a light emitting diode (LED) or a xenon lamp. According to an embodiment, the camera devices 105 and 108 may be arranged so that two or more lenses (e.g., wide-angle lens, super-wide-angle lens, or telephoto lens) and image sensors are positioned on one surface (e.g., first surface 111, second surface 112, third surface 121, or fourth surface 122) of the electronic device 100. In certain embodiments, the camera devices 105 and 108 may include time-of-flight (TOF) lenses and/or an image sensor.

According to certain embodiments, the key input device 106 (e.g., key button) may be disposed on the third side surface 113c of the first side member 113 of the first housing 110. In certain embodiments, the key input device 106 may be disposed on at least one of the other side surfaces 113a and 113b of the first housing 110 and/or the side surfaces 123a, 123b and 123c of the second housing 120. In certain embodiments, the electronic device 100 may not include some or all of the key input devices 106, and those not included key input devices 106 may be implemented in other forms, such as soft keys, on the flexible display 400. In certain embodiments, the key input device 106 may be implemented by using a pressure sensor included in the flexible display 400.

According to certain embodiments, some of the camera devices 105 and 108 (e.g., first camera device 105) or the sensor module 104 may be disposed to be exposed through the flexible display 400. For example, the first camera device 105 or the sensor module 104 may be arranged in the internal space of the electronic device 100 so as to be in contact with the external environment through an opening (e.g., through hole) formed at least partially in the flexible display 400. In another embodiment, some sensor modules 104 may be arranged in the internal space of the electronic device 100 so as to perform their functions without being visually exposed through the flexible display 400. For example, in this case, the opening of a region of the flexible display 400 facing the sensor module may be not needed.

Referring to FIG. 2B, the electronic device 100 may be operated to remain in an intermediate state through the hinge mechanism (e.g., hinge mechanism 140 in FIG. 1B). In this case, the electronic device 100 may control the flexible display 400 to display different pieces of content on the display area corresponding to the first surface 111 and the display area corresponding to the third surface 121. According to an embodiment, the electronic device 100 may be operated substantially in an unfolded state (e.g., unfolded state of FIG. 1A) and/or substantially in a folded state (e.g., folded state of FIG. 2A) with respect to a specific inflection angle (e.g., angle between the first housing 110 and the second housing 120 in the intermediate state) through the hinge mechanism (e.g., hinge mechanism 140 in FIG. 1B). For example, when a pressing force is applied in the unfolding direction (B direction) in a state where the electronic device 100 is unfolded at a specific inflection angle, through the hinge mechanism (e.g., hinge mechanism 140 in FIG. 1B), the electronic device 100 may be transitioned to an unfolded state (e.g., unfolded state of FIG. 1A). For example, when a pressing force is applied in the folding direction (C direction) in a state where the electronic device 100 is unfolded at a specific inflection angle, through the hinge mechanism (e.g., hinge mechanism 140 in FIG. 1B), the electronic device 100 may be transitioned to a closed state (e.g., folded state of FIG. 2A). In an embodiment, the electronic device 100 may be operated to remain in an unfolded state at various angles (not shown) through the hinge mechanism (e.g., hinge mechanism 140 in FIG. 1B).

FIGS. 1A, 1B, 1C, 2A, and 2B show an in-folding type in which the electronic device 100 operates such that, in the flat state or unfolding state, the first surface 111 of the first housing 110 and the third surface 121 of the second housing 120 face substantially the same first direction (z-axis direction) and, in the folding state, the first surface 111 and the third surface 121 face each other. However, in some embodiments, the electronic device 100 may operate in an out-folding type such that, in the flat state or unfolding state, the first surface 111 of the first housing 110 and the third surface 121 of the second housing 120 face substantially the same first direction (z-axis direction) and, in the folding state, the second surface 112 and the fourth surface 122 face each other.

Figure 3:
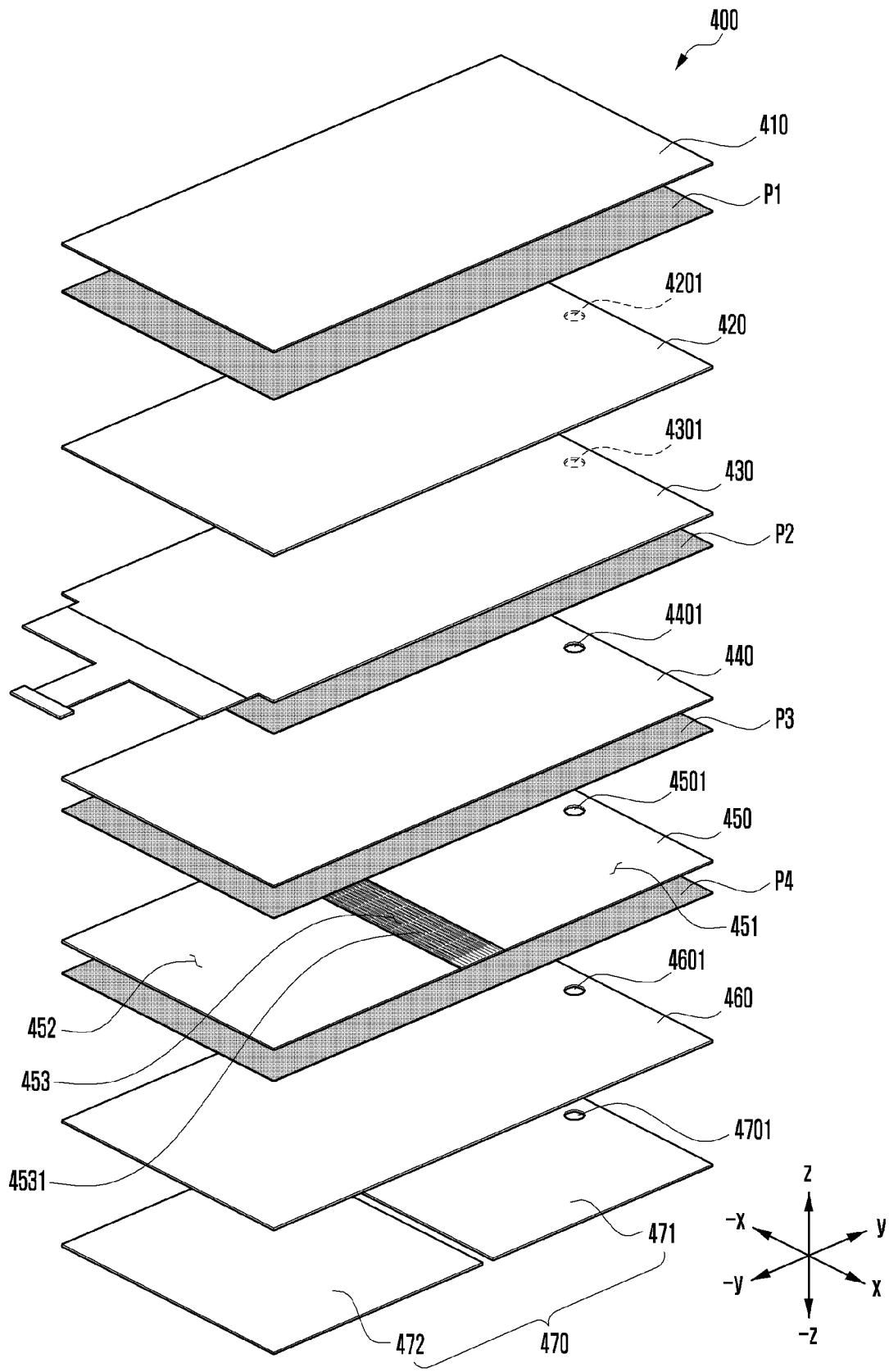
FIG. 3 is an exploded perspective view illustrating a flexible display according to an embodiment of the disclosure.

FIG. 3 is an exploded perspective view illustrating a flexible display according to an embodiment of the disclosure.

The flexible display 400 according to embodiments of the disclosure may include an unbreakable (UB) type organic LED (OLED) display (e.g., a curved display).

Referring to FIG. 3, the flexible display 400 may include a window layer 410 and also include a polarization layer 420 (polarizer (POL)) (e.g., a polarizing film), a display panel 430, a polymer layer 440, a support plate 450, a digitizer 460, and a reinforcing plate 470 which are sequentially disposed on the rear surface of the window layer 410. In some embodiments, the digitizer 460 may be disposed between the polymer layer 440 and the support plate 450 or between the display panel 430 and the polymer layer 440.

According to various embodiments, the window layer 410, the polarization layer 420, the display panel 430, the polymer layer 440, the support plate 450, and the digitizer 460 may be disposed to cross at least a portion of a first surface (e.g., the first surface 111 in FIG. 1A) of a first housing (e.g., the first housing 110 in FIG. 1A) and a third surface (e.g., the third surface 121 in FIG. 1A) of a second housing (e.g., the second housing 120 in FIG. 1A). According to an embodiment, the reinforcing plate 470 may include a first reinforcing plate 471 facing the first housing (e.g., the first housing 110 in FIG. 1A) and a second reinforcing plate 472 facing the second housing (e.g., the second housing 120 in FIG. 1A). According to an embodiment, the reinforcing plate 470 may be formed of a metal material (e.g., SUS). According to an embodiment, the window layer 410, the polarization layer 420, the display panel 430, the polymer layer 440, the support plate 450, the digitizer 460, and the reinforcing plate 470 may be attached to each other through adhesives P1, P2, P3, and P4. For example, the adhesives P1, P2, P3, and P4 may include at least one of an optical clear adhesive (OCA), a pressure sensitive adhesive (PSA), a heat-responsive adhesive, a normal adhesive, and a double-sided tape.

According to various embodiments, the display panel 430 may include a plurality of pixels and a wiring structure (e.g., an electrode pattern). According to an embodiment, the polarization layer 420 may selectively pass light generated from a light source of the display panel 430 and vibrating in a predetermined direction. According to an embodiment, the display panel 430 and the polarization layer 420 may be integrally formed. According to an embodiment, the flexible display 400 may include a touch panel (not shown).

According to various embodiments, the polymer layer 440 may be disposed under the display panel 430 to provide a dark background for ensuring the visibility of the display panel 430, and formed of a buffer material for a buffering action. In some embodiments, for waterproofing the flexible display 400, the polymer layer 440 may be removed or disposed under the support plate 450.

According to various embodiments, the support plate 450 may be formed in a shape that provides bendability to the flexible display 400. According to an embodiment, the support plate 450 may be formed of a material suitable for a detection operation of the digitizer 460 disposed thereunder. For example, the support plate 450 may be formed of a non-metallic thin plate material such as fiber reinforced plastics (FRP) (e.g., carbon fiber reinforced plastics (CFRP) or glass fiber reinforced plastics (GFRP)) having rigid characteristics for supporting the display panel 430. According to an embodiment, the support plate 450 may include a first flat portion 451 corresponding to the first housing (e.g., the first housing 110 in FIG. 1A), a second flat portion 452 corresponding to the second housing (e.g., the second housing 120 in FIG. 1A), and a bending portion 453 (or a flexible portion) connecting the first flat portion 451 and the second flat portion 452. According to an embodiment, the bending portion 453 may have a plurality of openings 4531 arranged at a predetermined interval. According to an embodiment, the bending characteristic of the bending portion 453 may be determined based on at least one of a size, shape, or arrangement density of at least some of the plurality of openings 4531. According to some embodiments, the support plate 450 may be formed of a metal material such as steel use stainless (SUS) (e.g., stainless steel (STS)), Cu, Al, or a metal clad (e.g., a stack member in which SUS and Al are alternately disposed). In this case, a plurality of openings may be formed over the entire area of the support plate so as to induce the detection operation of the digitizer disposed thereunder. According to an embodiment, the support plate 450 may be used to help reinforce the rigidity of an electronic device (e.g., the electronic device 100 in FIG. 1A), shield ambient noise, and dissipate heat emitted from nearby heat-generating components.

According to various embodiments, the flexible display 400 may include at least one functional member (not shown) disposed between the polymer layer 440 and the support plate 450 or below the support plate 450. According to an embodiment, the functional member may include a graphite sheet for heat dissipation, an added display, a force-touch flexible printed circuit board (FPCB), a fingerprint sensor FPCB, an antenna radiator for communication, or a conductive/non-conductive tape. According to an embodiment, when bending is not possible, the functional member may be individually disposed in the first housing (e.g., the first housing 110 in FIG. 1A) and the second housing (e.g., the second housing 120 in FIG. 1A). According to an embodiment, when bending is possible, the functional member may be disposed from the first housing (e.g., the first housing 110 in FIG. 1A) up to at least a portion of the second housing (e.g., the second housing 120 in FIG. 1A), passing through a hinge device (e.g., the hinge mechanism 140 in FIG. 1B).

According to various embodiments, the electronic device (e.g., the electronic device 100 in FIG. 1A) may include a camera device (e.g., the first camera device 105 in FIG. 1A) that is disposed under the flexible display 400 and detects an external environment through the flexible display 400. In some embodiments, the electronic device (e.g., the electronic device 100 in FIG. 1A) may include at least one sensor module (e.g., the sensor module 104 in FIG. 1A) (e.g., an illuminance sensor, a proximity sensor, or a TOF sensor) disposed under the flexible display 400. According to an embodiment, the polarization layer 420, the display panel 430, the polymer layer 440, the support plate 450, the digitizer 460, and the reinforcing plate 470 may have through-holes 4201, 4301, 4401, 4501, 4601, and 4701. In some embodiments, the display panel 430 and/or the polarization layer 420 may not need the through-holes 4201 and 4301 through adjustment in the transmittance of corresponding regions. In some embodiments, the sizes of the through-holes 4201, 4301, 4401, 4501, 4601, and 4701 may be determined based on the size of the camera device (e.g., the first camera device 105 in FIG. 1A) and/or the effective area (e.g., angle of view) of the camera device (e.g., the first camera device 105 in FIG. 1A), and the respective sizes of the through-holes 4201, 4301, 4401, 4501, 4601, and 4701 may be different from each other.

Figure 4:
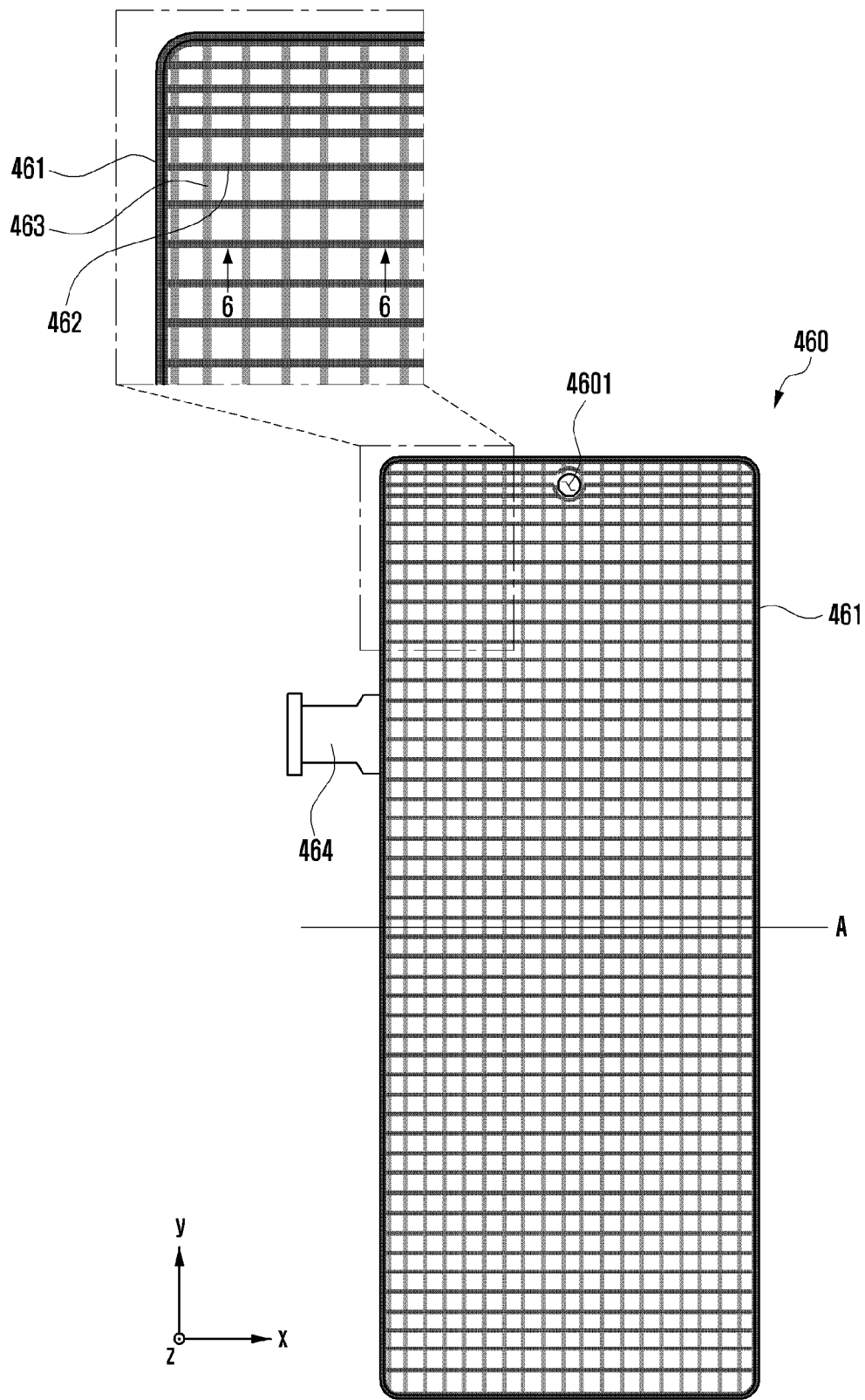
FIG. 4 is a configuration diagram illustrating a digitizer according to an embodiment of the disclosure.

According to various embodiments, the digitizer 460 may include a dielectric sheet (e.g., a dielectric sheet 461 in FIG. 4) having a plurality of layers (e.g., insulating layers), and a plurality of conductive patterns (e.g., a plurality of first conductive patterns 462 and a plurality of second conductive patterns 463 in FIG. 4) disposed on different layers of the dielectric sheet. The digitizer 460 according to an embodiment of the disclosure has an arrangement structure that a plurality of conductive patterns (e.g., the plurality of second conductive patterns 463 in FIG. 4) used as Tx channels (e.g., driving channels) are formed to be thicker at a position farther from the display panel 430 than a plurality of conductive patterns (e.g., the plurality of first conductive patterns 462 in FIG. 4) used as Rx channels (e.g., reception channels). This may not only reduce the overall thickness of the digitizer 460, but also reduce the resistance of the Tx channel, thereby helping to exhibit excellent detection performance even with a small current. In addition, the digitizer 460 has a stacked structure that the thickness of the plurality of conductive patterns (e.g., the plurality of first conductive patterns 462 in FIG. 4) used as the Rx channels adjacent to the display panel 430 is relatively reduced. This may help improve visibility that traces of the plurality of conductive patterns are not visible from the outside of the flexible display 400.

Hereinafter, the configuration of the digitizer 460 will be described in detail.

FIG. 4 is a configuration diagram illustrating a digitizer according to an embodiment of the disclosure.

Referring to FIG. 4, the digitizer 460 may include a dielectric sheet 461 (e.g., a dielectric film or a dielectric substrate) (e.g., a polyimide (PI) substrate or a polypropylene glycol (PPG) substrate) having a plurality of layers, and a plurality of conductive patterns 462 and 463 (e.g., coil patterns or coil members) (e.g., Cu patterns) disposed in the dielectric sheet 461. According to an embodiment, the plurality of conductive patterns 462 and 463 may include a plurality of first conductive patterns 462 disposed on a first layer (e.g., a first layer 4612 in FIG. 6) of the dielectric sheet 461, and a plurality of second conductive patterns 463 disposed on a second layer (e.g., a second layer 4613 in FIG. 6) different from the first layer 4612. According to an embodiment, the plurality of first conductive patterns 462 may be spaced apart from each other at a predetermined interval and arranged to have a length in a first direction (e.g., the x-axis direction). According to an embodiment, the plurality of second conductive patterns 463 may be spaced apart from each other at a predetermined interval and arranged to have a length in a second direction (e.g., the y-axis direction). According to an embodiment, when the digitizer 460 is viewed from above, the plurality of first conductive patterns 462 and the plurality of second conductive patterns 463 may be arranged to cross each other. According to an embodiment, when the digitizer 460 is viewed from above, the plurality of first conductive patterns 462 and the plurality of second conductive patterns 463 may be arranged to be perpendicular to each other. According to an embodiment, the digitizer 460 may include a connector portion 464 (e.g., the BtoB connector) electrically connected to the plurality of conductive patterns 462 and 463 and extending outwardly from the dielectric sheet 461. According to an embodiment, the connector portion 464 may be electrically connected to a substrate (e.g., a substrate 160 in FIG. 7) (e.g., a printed circuit board or a main board) of an electronic device (e.g., the electronic device 100 in FIG. 1A).

According to various embodiments, the plurality of first conductive patterns 462 may operate as Rx channels for detecting a magnetic field received from the electronic pen. In some embodiments, both the plurality of first conductive patterns 462 and the plurality of second conductive patterns 463 may operate as Rx channels for detecting a magnetic field received from the electronic pen. According to an embodiment, the plurality of second conductive patterns 463 may operate as Tx channels for forming a magnetic field through an applied current. According to an embodiment, the second layer 4613 may be disposed at a position farther from the display panel (e.g., the display panel 430 in FIG. 3) than the first layer 4612, and the plurality of second conductive patterns 463 may be formed to have a relatively greater thickness than the plurality of first conductive patterns 462. Therefore, the plurality of second conductive patterns 463 having a relatively greater thickness may have a low resistance, thereby helping to reduce the consumption of currents applied to the Tx channels while maintaining equivalent detection performance.

Figure 5:
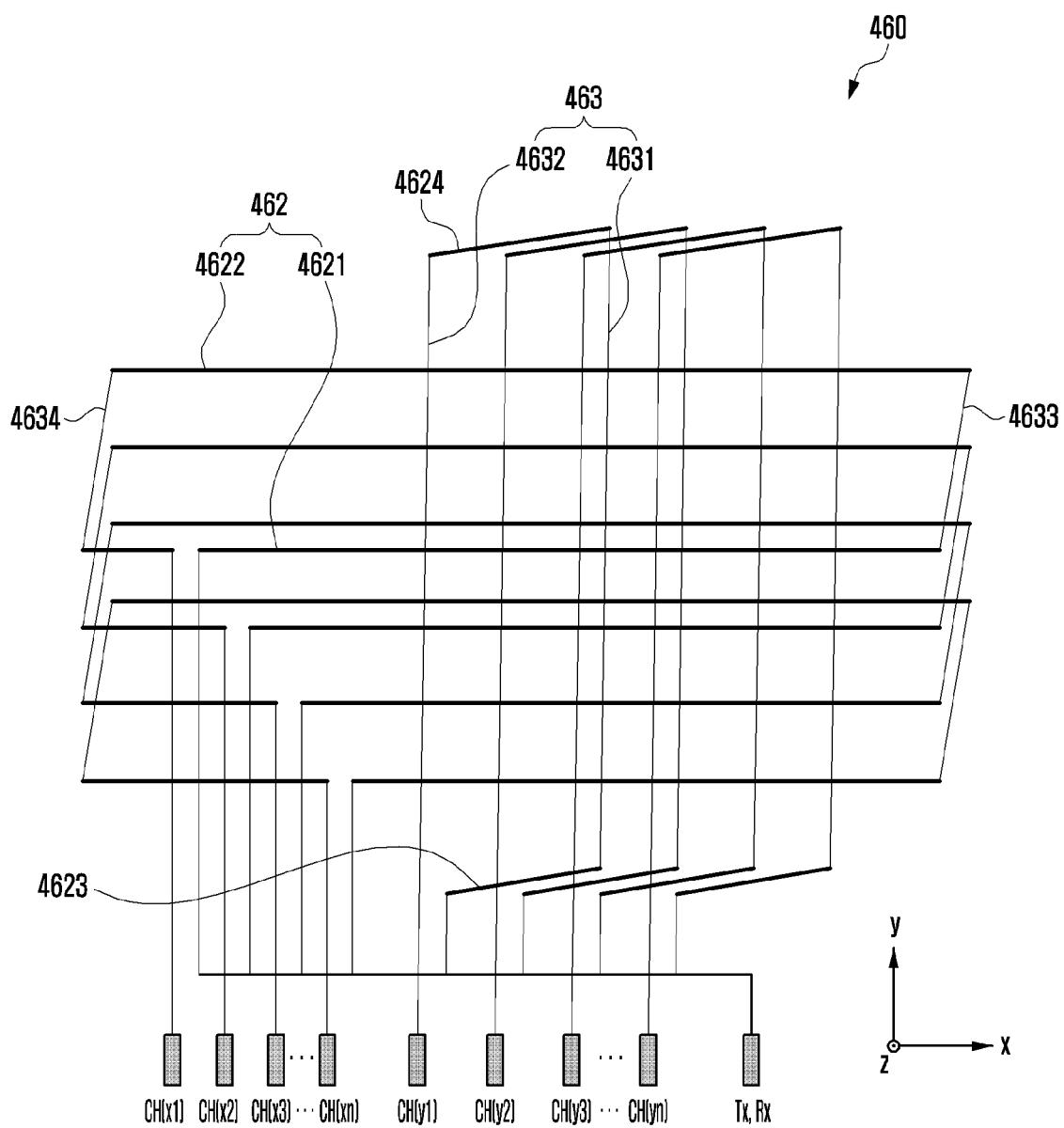
FIG. 5 is a schematic diagram illustrating an arrangement configuration of a plurality of conductive patterns of a digitizer according to an embodiment of the disclosure.

FIG. 5 is a schematic diagram illustrating an arrangement configuration of a plurality of conductive patterns of a digitizer according to an embodiment of the disclosure.

Referring to FIG. 5, the digitizer 460 may include the plurality of first conductive patterns 462 spaced apart from each other at a predetermined interval and arranged to have a length in the first direction (e.g., the x-axis direction) and the plurality of second conductive patterns 463 spaced apart from each other at a predetermined interval and arranged to have a length in the second direction (e.g., the y-axis direction) perpendicular to the first direction (e.g., the x-axis direction). According to an embodiment, the digitizer 460 may include a plurality of first channels CH(x1), CH(x2), CH(x3) . . . CH(xn) formed through the plurality of first conductive patterns 462, and a plurality of second channels CH(y1), CH(y2), CH(y3) . . . CH(yn) formed through the plurality of second conductive patterns 463.

According to various embodiments, each of the plurality of first channels CH(x1), CH(x2), CH(x3) . . . CH(xn) may include a first conductive line 4621 and a second conductive line 4622 disposed adjacently and spaced apart along the first direction (e.g., the x-axis direction) in the first layer (e.g., the first layer 4612 in FIG. 6) of the dielectric sheet (e.g., the dielectric sheet 461 in FIG. 6). According to an embodiment, the first conductive line 4621 and the second conductive line 4622 may be connected at both ends through a first sub-line 4633 and a second sub-line 4634 disposed in the second layer (e.g., the second layer 4613 in FIG. 6). According to an embodiment, each of the plurality of first channels CH(x1), CH(x2), CH(x3) . . . CH(xn) may be formed in a loop shape having a length in the first direction (e.g., the x-axis direction) through a pair of the conductive lines 4621 and 4622 and a pair of the sub-lines 4633 and 4634. According to an embodiment, the pair of sub-lines 4633 and 4634 may be arranged along the edge of the dielectric sheet 461 at a position adjacent to the edge of the dielectric sheet 461. In some embodiments, when the first and second conductive lines 4621 and 4622 are directly connected in the first layer (e.g., the first layer 4612 in FIG. 6), the pair of sub-lines 4633 and 4634 may be omitted.

According to various embodiments, each of the plurality of second channels CH(y1), CH(y2), CH(y3) . . . CH(yn) may include a third conductive line 4631 and a fourth conductive line 4632 disposed adjacently and spaced apart along the second direction (e.g., the y-axis direction) in the second layer (e.g., the second layer 4613 in FIG. 6) of the dielectric sheet (e.g., the dielectric sheet 461 in FIG. 6). According to an embodiment, the third conductive line 4631 and the fourth conductive line 4632 may be connected at both ends through a third sub-line 4623 and a fourth sub-line 4624 disposed in the first layer (e.g., the first layer 4612 in FIG. 6). According to an embodiment, each of the plurality of second channels CH(y1), CH(y2), CH(y3) . . . CH(yn) may be formed in a loop shape having a length in the second direction (e.g., the y-axis direction) through a pair of the conductive lines 4631 and 4632 and a pair of the sub-lines 4623 and 4624. According to an embodiment, the pair of sub-lines 4623 and 4624 may be arranged along the edge of the dielectric sheet 461 at a position adjacent to the edge of the dielectric sheet 461. In some embodiments, when the third and fourth conductive lines 4631 and 4632 are directly connected in the second layer (e.g., the second layer 4613 in FIG. 6), the pair of sub-lines 4623 and 4624 may be omitted.

According to various embodiments, when a current is applied to the digitizer 460 through the Tx channel commonly connected to the plurality of second channels CH(y1), CH(y2), CH(y3) CH(yn), the plurality of second channels CH(y1), CH(y2), CH(y3) CH(yn) may form a magnetic field through a loop shape. When the current applied to the digitizer 460 is cut off and the electronic pen approaches the digitizer 460, a magnetic field may be generated through a coil member of the electronic pen. Accordingly, the plurality of first channels CH(x1), CH(x2), CH(x3) . . . CH(xn) and the plurality of second channels CH(y1), CH(y2), CH(y3) . . . CH(yn) may generate an induced electromotive force at a designated position through the magnetic field received from the electronic pen, and the digitizer 460 may detect the position and pen pressure of electronic pen through the position and strength of the induced electromotive force.

Figure 6:
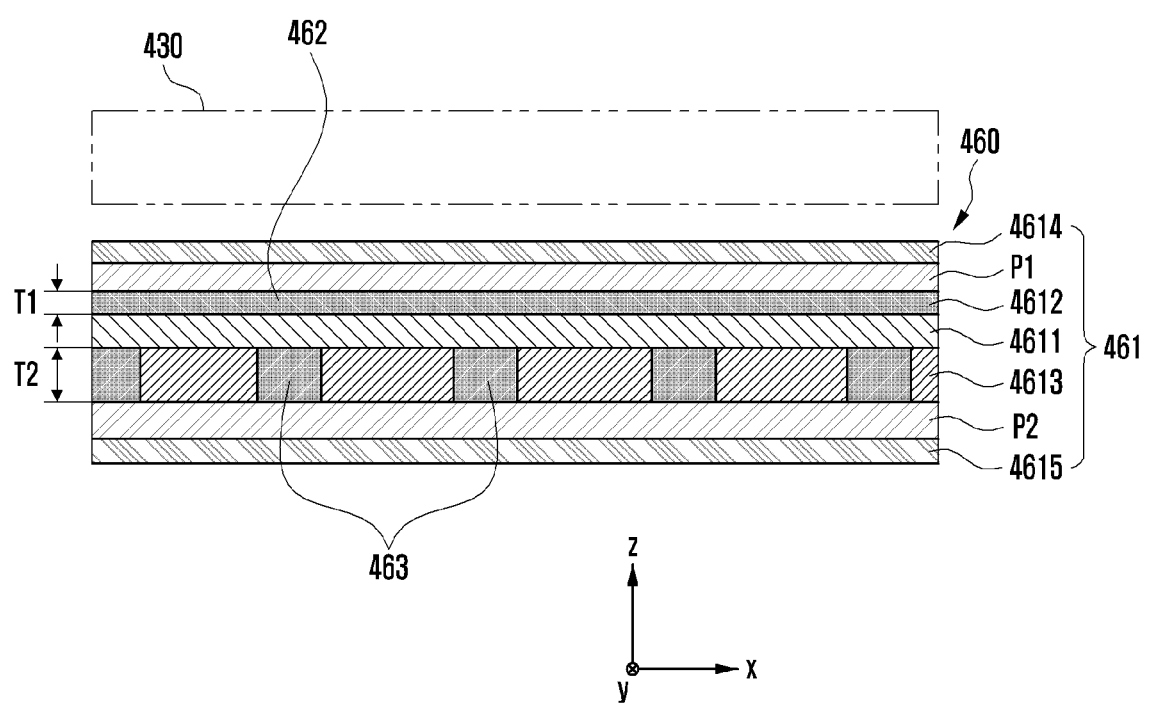
FIG. 6 is a partial cross-sectional view of the digitizer taken along a line 6-6 of FIG. 4 according to an embodiment of the disclosure.

FIG. 6 is a partial cross-sectional view of the digitizer taken along a line 6-6 of FIG. 4 according to an embodiment of the disclosure.

Referring to FIG. 6, the digitizer 460 may include the dielectric sheet 461 having a plurality of layers, and the plurality of conductive patterns 462 and 463 disposed in the dielectric sheet 461. According to an embodiment, the plurality of conductive patterns 462 and 463 may include the plurality of first conductive patterns 462 spaced apart from each other at a predetermined interval and arranged to have a length in the first direction (e.g., the x-axis direction) in the first layer 4612 of the dielectric sheet 461, and the plurality of second conductive patterns 463 spaced apart from each other at a predetermined interval and arranged to have a length in the second direction (e.g., the y-axis direction) orthogonal to the first direction (e.g., the x-axis direction) in the second layer 4613 different from the first layer 4612. According to an embodiment, the first layer 4612 may be located closer to the display panel 430 than the second layer 4613. According to an embodiment, the dielectric sheet 461 may include an insulating layer 4611 between the first layer 4612 and the second layer 4613. According to an embodiment, the dielectric sheet 461 may include a first coverlay 4614 stacked on the first layer 4612 through a first adhesive layer P1. According to an embodiment, the dielectric sheet 461 may include a second coverlay 4615 stacked under the second layer 4613 through a second adhesive layer P2. According to an embodiment, at least one of the first coverlay 4614, the second coverlay 4615, and the insulating layer 4611 of the dielectric sheet 461 may be formed of polyimide (PI).

According to various embodiments, the first thickness T1 of the plurality of first conductive patterns 462 disposed in the first layer 4612 may be relatively smaller than the second thickness T2 of the plurality of second conductive patterns 463 disposed in the second layer 4613. According to an embodiment, the plurality of second conductive patterns 463 disposed in the second layer 4613 may be used as Tx channels. According to an embodiment, the plurality of second conductive patterns 463 disposed in the second layer 4613 and the plurality of first conductive patterns 462 disposed in the first layer 4612 may be used as Rx channels. According to an embodiment, the thickness of the first adhesive layer P1 may be formed to be at least 80% or more of the first thickness T1 for insulation. According to an embodiment, the thickness of the second adhesive layer P2 may be formed to be at least 80% or more of the second thickness T2 for insulation. According to an embodiment, the first adhesive layer P1 and/or the second adhesive layer P2 may include at least one of an optical clear adhesive (OCA), a pressure sensitive adhesive (PSA), a heat-reactive adhesive, a normal adhesive, or a double-sided tape.

According to various embodiments, in the digitizer 460, by decreasing the first thickness T1 and increasing the second thickness T2 while maintaining the overall thickness of the dielectric sheet 461 at the equivalent level as before, it is possible to lead to a decrease in resistance of the plurality of second conductive patterns 463. Therefore, the consumption of a current applied to the Tx channel may be reduced, and the detection performance of the digitizer 460 may be maintained at the equivalent level or improved. According to an embodiment, in the digitizer 460, the first thickness T1 may be reduced while the second thickness T2 is maintained. Therefore, the overall thickness of the digitizer 460 is reduced and may help to slim the electronic device (e.g., the electronic device 100 in FIG. 1A). In addition, because the plurality of second conductive patterns 463 having a relatively great thickness are disposed in the second layer 4613 which is relatively far from the display panel 430, traces of step differences between the plurality of conductive patterns are not viewed from the outside of the display (e.g., the flexible display 400 in FIG. 1A) and thereby the visibility may be improved.

Referring to Table 1 below, in case of an existing digitizer in which the plurality of first conductive patterns 462 disposed in the first layer 4612 and the plurality of second conductive patterns 463 disposed in the second layer 4613 have the same thickness, the total thickness is 97.5 μm, and the pattern resistance of the plurality of second conductive patterns 463 used as the Tx channel may be 3.282Ω.

According to embodiments of the disclosure, in case (1st embodiment) of reducing the total thickness of the digitizer 460 to 74.5 μm compared to the existing one by reducing the first thickness T1 of the plurality of first conductive patterns 462 disposed in the first layer 4612 to 7 μm and maintaining the second thickness T2 of the plurality of second plurality of conductive patterns 463 disposed in the second layer 4613, in case (2nd embodiment) of reducing the total thickness of the digitizer 460 to 79 μm compared to the existing one by reducing the first thickness T1 of the plurality of first conductive patterns 462 disposed in the first layer 4612 to 7 μm and increasing the second thickness T2 of the plurality of second plurality of conductive patterns 463 disposed in the second layer 4613 to 22 μm, and in case (3rd embodiment) of reducing the total thickness of the digitizer 460 to 84 μm compared to the existing one by reducing the first thickness T1 of the plurality of first conductive patterns 462 disposed in the first layer 4612 to 7 μm and increasing the second thickness T2 of the plurality of second plurality of conductive patterns 463 disposed in the second layer 4613 to 25 μm, it can be seen that the pattern resistances are exhibited at a level equivalent to the existing digitizer, such as 3.85 Ω, 3.578Ω, and 3.254Ω, respectively. In particular, in case of the 3rd embodiment, it can be seen that the total thickness is reduced compared to the existing digitizer and the pattern resistance becomes smaller. This means that if the second thickness T2 of the plurality of second conductive patterns 463 disposed in the second layer 4613 used as the Tx channel is appropriately adjusted while the first thickness T1 of the plurality of first conductive patterns 462 disposed in the first layer 4612 used as the Rx channel is reduced, the total thickness of the digitizer 460 may be reduced to help slim the electronic device, or the pattern resistance may be reduced to help reduce current consumption.

TABLE 1

| Digitizer | | Existing | 1st Embodiment | 2nd Embodiment | 3rd Embodiment |
|---|---|---|---|---|---|
| 1st coverlay | PI | 7.5 | 7.5 | 7.5 | 7.5 |
| | 1st adhesive layer | 15 | 5 | 5 | 5 |
| 1st layer | 1st conductive pattern | 20 | 7 | 7 | 7 |
| Insulating layer | | 12.5 | 12.5 | 12.5 | 12.5 |
| 2nd layer | 2nd conductive pattern | 20 | 20 | 22 | 25 |
| 2nd coverlay | 2nd adhesive layer | 15 | 15 | 17.5 | 20 |
| | PI | 7.5 | 7.5 | 7.5 | 7.5 |
| Total thickness | | 97.5 | 74.5 | 79 | 84.5 |
| Pattern resistance | | 3.282 | 3.85 | 3.578 | 3.254 |

Figure 7:
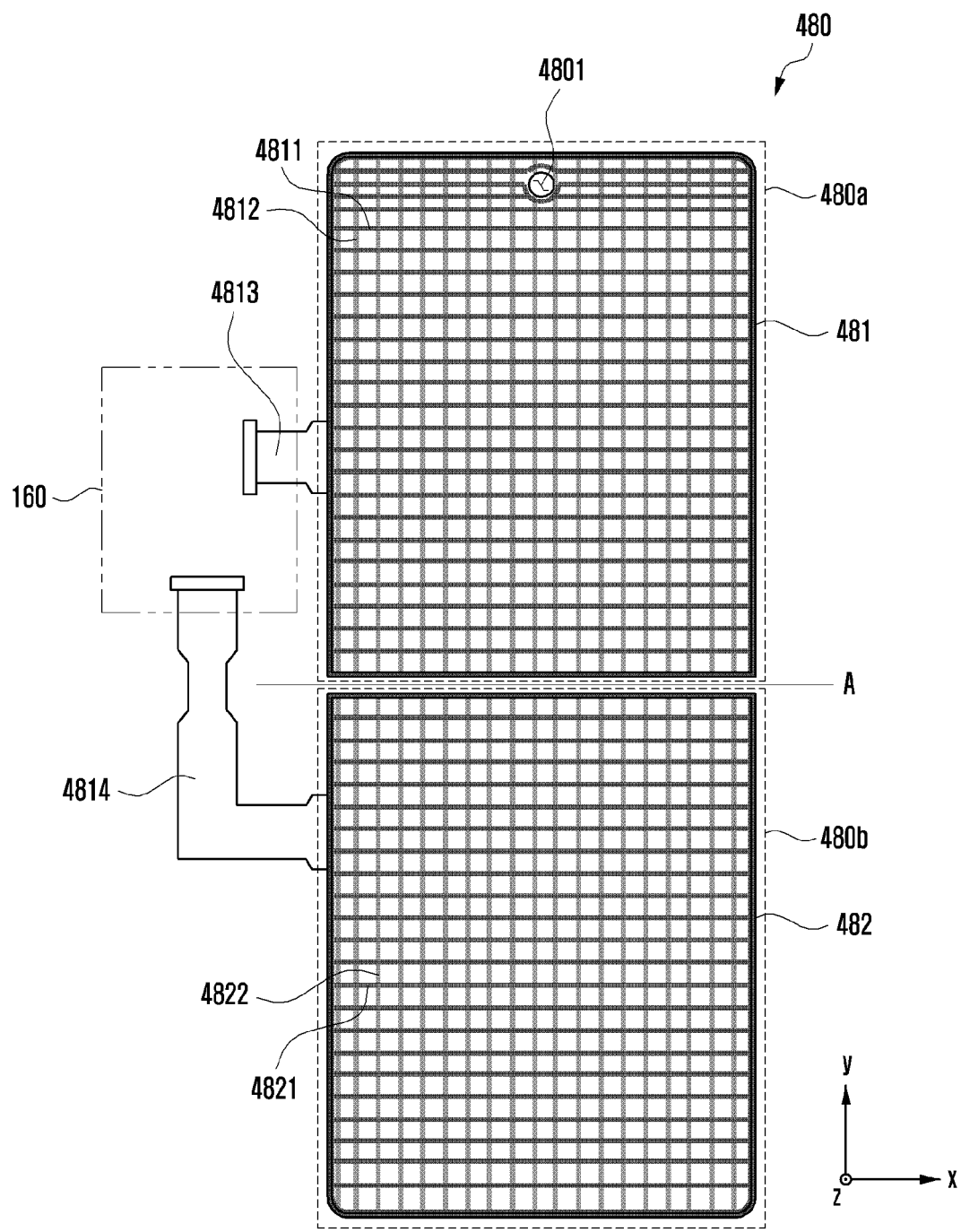
FIG. 7 is a configuration diagram illustrating a digitizer according to an embodiment of the disclosure.

FIG. 7 is a configuration diagram illustrating a digitizer according to an embodiment of the disclosure.

According to various embodiments, in case of a foldable electronic device (e.g., the electronic device 100 in FIG. 1A) in which a first housing (e.g., the first housing 110 in FIG. 1A) and a second housing (e.g., the second housing 120 in FIG. 1A) are foldably combined through a hinge device (e.g., the hinge mechanism 140 in FIG. 1B) based on the folding axis A, if one dielectric sheet (e.g., the dielectric sheet 461 in FIG. 4) is disposed across from the first housing to the second housing, fatigue may be accumulated in a bending region due to frequent folding operations, and thereby a disconnection problem may occur in the plurality of conductive patterns (e.g., the plurality of conductive patterns 462 and 463 in FIG. 4). In order to solve this problem, the electronic device (e.g., the electronic device 100 in FIG. 1A) may include a digitizer 480 including a pair of dielectric sheets 481 and 482 separately disposed in corresponding housing areas.

Referring to FIG. 7, the digitizer 480 (e.g., the digitizer 460 in FIG. 3) may include a first dielectric sheet 481 disposed in an area 480a corresponding to the first housing (e.g., the first housing 110 in FIG. 1A) and having a through-hole 4801, and a second dielectric sheet 482 disposed in an area 480b corresponding to the second housing (e.g., the second housing 120 in FIG. 1A). According to an embodiment, the digitizer 480 may include, in the first dielectric sheet 481, a plurality of first conductive patterns 4811 spaced apart at a predetermined interval and arranged to have a length in a first direction (e.g., the x-axis direction), and a plurality of second conductive patterns 4812 spaced apart at a predetermined interval and arranged to have a length in a second direction (e.g., the y-axis direction) perpendicular to the first direction (e.g., the x-axis direction). According to an embodiment, the digitizer 480 may include, in the second dielectric sheet 482, a plurality of third conductive patterns 4821 spaced apart at a predetermined interval and arranged to have a length in the first direction (e.g., the x-axis direction), and a plurality of fourth conductive patterns 4822 spaced apart at a predetermined interval and arranged to have a length in the second direction (e.g., the y-axis direction) perpendicular to the first direction (e.g., the x-axis direction). According to an embodiment, the digitizer 480 may include a first connector portion 4813 electrically connected to the plurality of first and second conductive patterns 4811 and 4812 and extending outwardly from the first dielectric sheet 481. According to an embodiment, the digitizer 480 may include a second connector portion 4814 electrically connected to the plurality of third and fourth conductive patterns 4821 and 4822 and extending outwardly from the second dielectric sheet 482. According to an embodiment, the first connector portion 4813 and the second connector portion 4814 may be electrically connected to a substrate 160 disposed in the electronic device (e.g., the electronic device 100 in FIG. 1A). According to an embodiment, the plurality of first conductive patterns 4811 and the plurality of third conductive patterns 4821 may perform substantially the same function as or have the same thickness as the plurality of first conductive patterns 462 shown in FIG. 4. According to an embodiment, the plurality of second conductive patterns 4812 and the plurality of fourth conductive patterns 4822 may perform substantially the same function as or have the same thickness as the plurality of second conductive patterns 463 shown in FIG. 4.

Figure 8A:
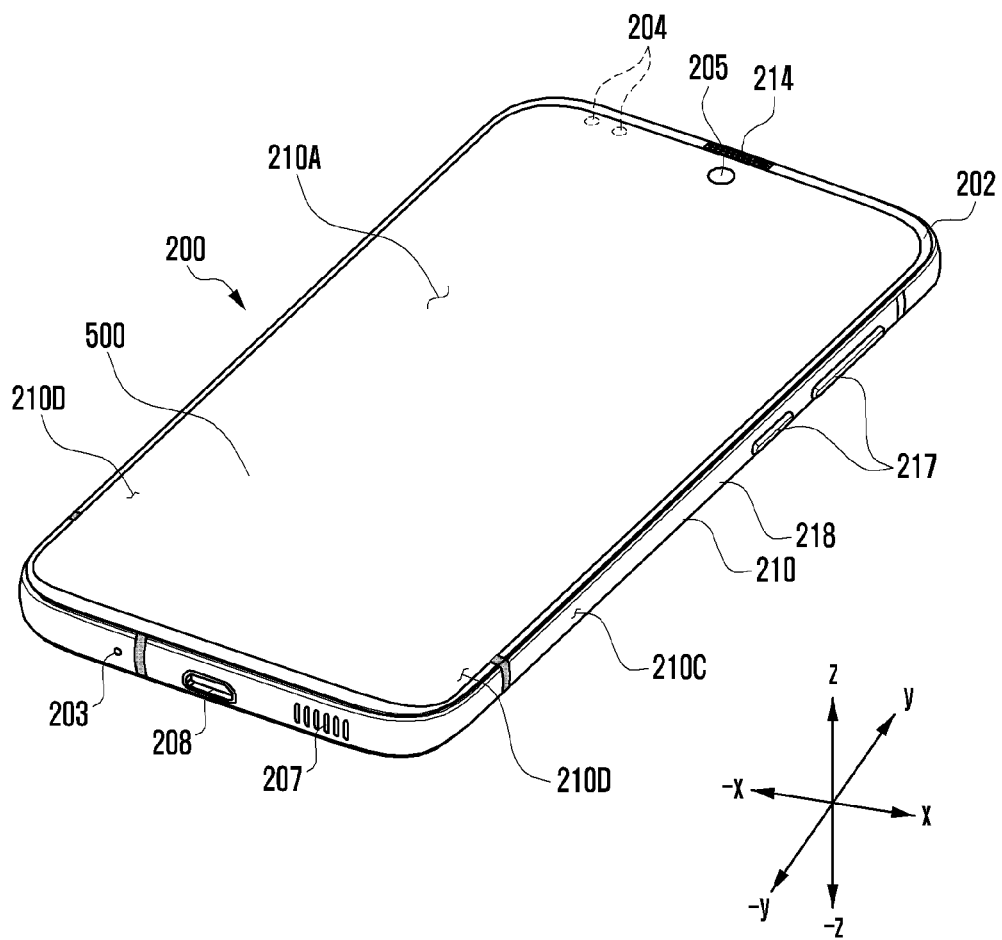
FIG. 8A is a perspective view illustrating an electronic device according to an embodiment of the disclosure.

FIG. 8A is a perspective view illustrating an electronic device according to an embodiment of the disclosure.

Figure 8B:
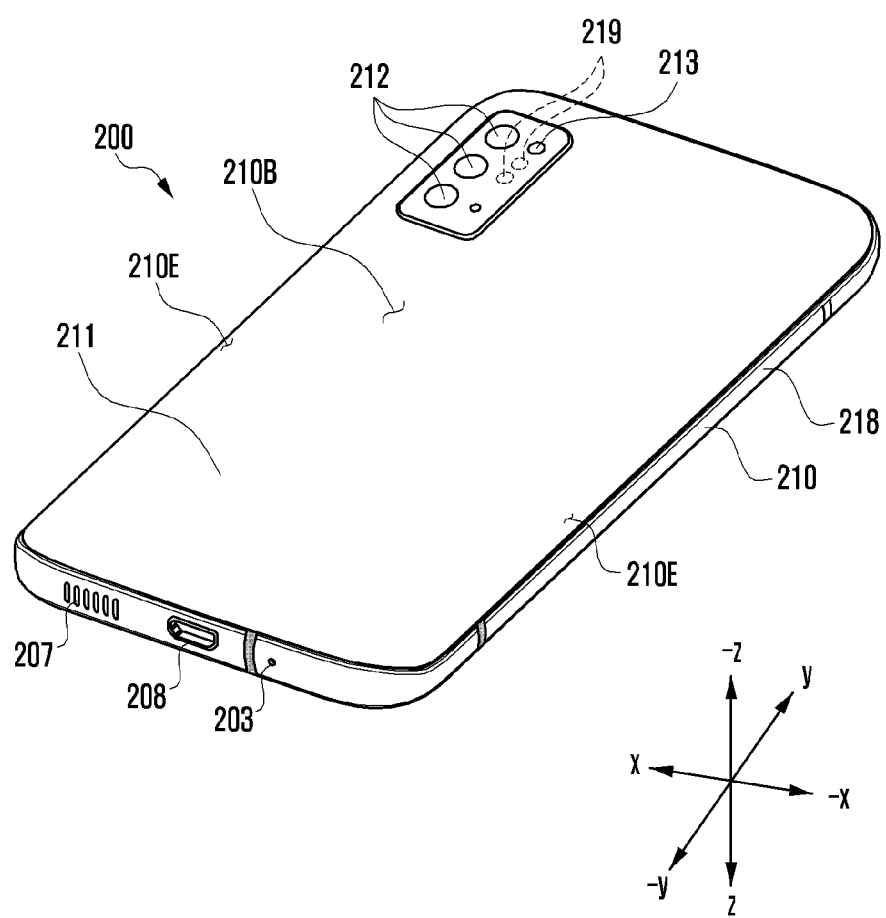
FIG. 8B is a rear perspective view illustrating the electronic device of FIG. 8A according to an embodiment of the disclosure.

FIG. 8B is a rear perspective view illustrating the electronic device of FIG. 8A according to an embodiment of the disclosure.

Referring to FIGS. 8A and 8B, the electronic device 200 according to an embodiment may include a housing 210 that includes a first surface (or front surface) 210A, a second surface (or rear surface) 210B, and a lateral surface 210C surrounding a space between the first surface 210A and the second surface 210B. In another embodiment (not shown), the housing 210 may refer to a structure that forms some of the first surface 210A, the second surface 210B, and the lateral surface 210C. According to an embodiment, the first surface 210A may be formed by a front plate 202 (e.g., a glass plate having various coating layers, or a polymer plate) at least a portion of which is substantially transparent. The second surface 210B may be formed by a substantially opaque rear plate 211. The rear plate 211 may be formed of, for example, coated or colored glass, ceramic, polymer, metal (e.g., aluminum, stainless steel (STS), or magnesium), or a combination of at least two of the above materials. The lateral surface 210C may be formed by a lateral bezel structure 218 (or "lateral surface member") including a metal and/or a polymer and combined with the front plate 202 and the rear plate 211. In a certain embodiment, the rear plate 211 and the lateral bezel structure 218 may be integrally formed and may have the same material (e.g., a metal material such as aluminum).

In the illustrated embodiment, the front plate 202 may have, in both long edges thereof, a first region 210D that is seamlessly extended from the first surface 210A and bent toward the rear plate. In the illustrated embodiment (see FIG. 8B), the rear plate 211 may have, in both long edges thereof, a second region 210E that is seamlessly extended from the second surface 210B and bent toward the front plate. In some embodiments, the front plate 202 or the rear plate 211 may have only one of the first region 210D or the second region 210E. In some embodiments, the front plate 202 may not have the first region and the second region, and may have only a flat plane disposed in parallel with the second surface 210B. In the above embodiments, when viewed from the side of the electronic device, the lateral bezel structure 218 may have a first thickness (or width) at a lateral surface not having the first region 210D nor the second region 210E, and may have a second thickness smaller than the first thickness at a lateral surface having the first region or the second region.

According to an embodiment, the electronic device 200 may include at least one of a display 500, an input device 203, sound output devices 207 and 214, sensor modules 204 and 219, camera modules 205, 212, and 213, a key input device 217, an indicator (not shown), and a connector hole 208. In some embodiments, the electronic device 200 may omit at least one (e.g., the key input device 217 or the indicator) of the above components or further include any other component.

The display 500 may be exposed through a considerable portion of the front plate 202, for example. In some embodiments, at least a portion of the display 500 may be exposed through the front plate 202 that forms the first surface 210A and the first region 210D of the lateral surface 210C. The display 500 may be combined with or disposed adjacent to a touch sensing circuit, a pressure sensor for measuring the intensity (pressure) of a touch, and/or a digitizer for detecting a stylus pen of a magnetic field type. In some embodiments, at least a part of the sensor modules 204 and 219, and/or at least a part of the key input device 217 may be disposed in the first region 210D and/or the second region 210E.

The input device 203 may include a microphone. In some embodiments, the input device 203 may include a plurality of microphones arranged to identify the direction of sound. The sound output devices 207 and 214 may include speakers. The speakers may include an external speaker (sound output device 207) and a call receiver 214. In some embodiments, the microphone, the speakers, and the connector hole 208 may be disposed in the space of the electronic device 200 and exposed to an external environment through at least one hole formed in the housing 210. In some embodiments, such a hole formed in the housing 210 may be commonly used for the microphone and the speakers. In some embodiments, the sound output devices 207 and 214 may include a speaker (e.g., a piezo speaker) that operates without any hole formed in the housing 210.

The sensor modules 204 and 219 may generate an electrical signal or data value corresponding to an internal operating state of the electronic device 200 or an external environmental state. The sensor modules 204 and 219 may include, for example, a first sensor module 204 (e.g., a proximity sensor) and/or a second sensor module (not shown) (e.g., a fingerprint sensor) disposed in the first surface 210A of the housing 210, and/or a third sensor module 219 (e.g., an HRM sensor) disposed in the second surface 210B of the housing 210. The fingerprint sensor may be disposed in the first surface 210A of the housing 210. The fingerprint sensor (e.g., an ultrasonic type or an optical type) may be disposed under the display 500 in the first surface 210A. The electronic device 200 may further include a sensor module not shown, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor (i.e., sensor module 204).

The camera modules 205, 212, and 213 may include a first camera module 205 disposed in the first surface 210A of the electronic device 200, a second camera module 212 disposed in the second surface 210B of the electronic device 200, and/or a flash 213. The camera modules 205 and 212 may include one or more lenses, an image sensor, and/or an image signal processor. The flash 213 may include, for example, a light emitting diode or a xenon lamp. In some embodiments, two or more lenses (wide angle and telephoto lenses) and image sensors may be disposed in one surface of the electronic device 200.

The key input device 217 may be disposed in the lateral surface 210C of the housing 210. In another embodiment, the electronic device 200 may not include some or all of the above-mentioned key input devices 217, which may be implemented in another form, such as a soft key, on the display 500. In another embodiment, the key input device 217 may be implemented using a pressure sensor included in the display 500.

The indicator may be disposed, for example, in the first surface 210A of the housing 210. The indicator may provide, for example, status information of the electronic device 200 in the form of light. In another embodiment, the light emitting device may provide, for example, a light source that interoperates with the camera module 205. The indicator may include, for example, LED, IR LED, and xenon lamp.

The connector hole 208 may include a first connector hole 208 capable of receiving a connector (e.g., a universal serial bus (USB) connector or an interface connector port module (IF) module) for transmitting and receiving power and/or data to and from an external electronic device, and/or a second connector hole (or earphone jack) capable of receiving a connector for transmitting and receiving audio signals to and from an external electronic device.

Some of the camera modules 205 and 212, some of the sensor modules 204 and 219, or the indicator may be disposed to be exposed through the display 500. For example, the camera module 205, the sensor module 204, or the indicator may be disposed so as to be in contact with the external environment through an opening perforated to the front plate 202 of the display 500 in the internal space of the electronic device 200. According to an embodiment, a region of the display 500 facing the camera module 205 is a part of an area displaying content and may be formed as a transmissive region having a predetermined transmittance. According to an embodiment, the transmissive region may be formed to have a transmittance ranging from about 5% to about 20%. The transmissive region may include a region that overlaps with an effective area (e.g., an angle-of-view area) of the camera module 205 through which light for generating an image on the image sensor passes. For example, the transmissive region of the display 500 may include a region having a lower pixel density than the surrounding region. For example, the transmissive region may replace the aforementioned opening. For example, the camera modules 205 may include an under display camera (UDC). In another embodiment, the sensor module 204 may be arranged to perform its function without being visually exposed through the front plate 202 in the internal space of the electronic device. For example, in this case, a region of the display 500 facing the sensor module may not need a perforated opening.

Figure 9:
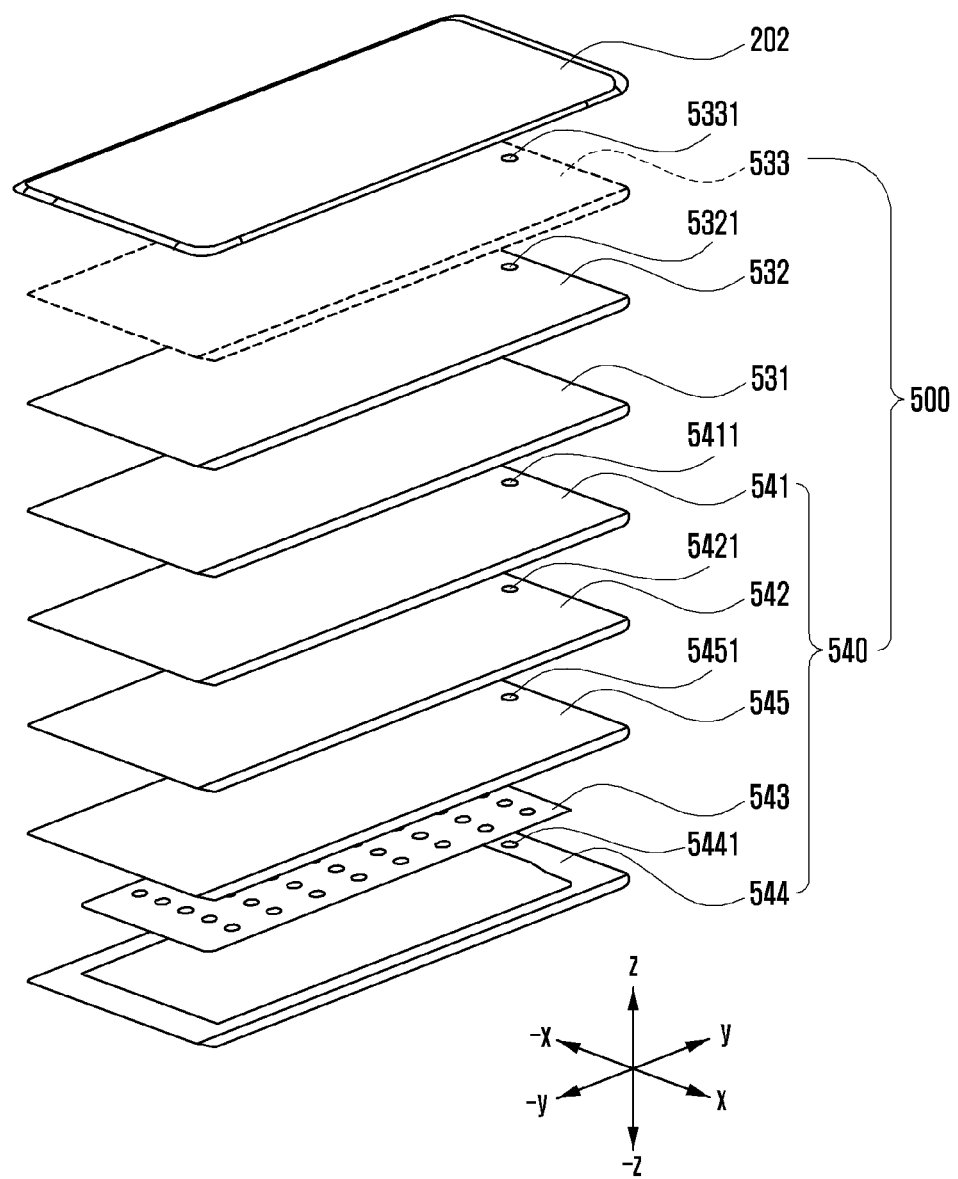
FIG. 9 is an exploded perspective view illustrating the display of FIG. 8A according to an embodiment of the disclosure.

FIG. 9 is an exploded perspective view illustrating the display of FIG. 8A according to an embodiment of the disclosure.

Referring to FIG. 9, the display 500 may include a polarizer (POL) 532 (e.g., a polarizing film or a polarization layer), a display panel 531, which are sequentially disposed on the rear surface of a front cover (e.g., a front plate 202, a glass plate, a first cover member, or a cover member) through an adhesive member, and at least one additional layer 540 attached to the rear surface of the display panel 531. According to an embodiment, the adhesive member may include an optical clear adhesive (OCA), a pressure sensitive adhesive (PSA), a heat-reactive adhesive, a normal adhesive, or a double-sided tape. According to an embodiment, the display panel 531 and the POL 532 may be integrally formed.

According to various embodiments, the display 500 may include a control circuit (not shown). According to an embodiment, the control circuit may include a flexible printed circuit board (FPCB) that electrically connects a main board (not shown) of the electronic device (e.g., the electronic device 200 in FIG. 8A) and the display panel 531, and a display driver IC (DDI) mounted on the FPCB. According to an embodiment, the display 500 may further include a touch panel 533. According to an embodiment, when the display 500 operates as an in-cell type or on-cell type touch display depending on the arrangement position of the touch panel 533, the control circuit may include a touch display driver IC (TDDI). In another embodiment, the display 500 may include a fingerprint sensor (not shown) disposed around the control circuit. According to an embodiment, the fingerprint sensor may include an ultrasonic or optical fingerprint sensor capable of recognizing a fingerprint of a finger in contact or proximity from the outer surface of the front cover (i.e., front plate 202) through a hole at least partially formed in some of components of the display 500.

According to various embodiments, the at least one additional layer 540 may include at least one polymer member 541 and 542 disposed on the rear surface of the display panel 531, a digitizer 545 disposed on the rear surface of the at least one polymer member 541 and 542, at least one functional member 543 disposed on the rear surface of the digitizer 545, and a conductive member 544 disposed on the rear surface of the at least one functional member 543. According to an embodiment, the at least one polymer member 541 and 542 may include the polymer member 541 referred to as a light blocking layer (e.g., a black layer having an uneven pattern) for removing air bubbles generated between the display panel 531 and attachments thereunder and blocking light generated from the display panel 531 or light incident from the outside, and/or a buffer layer (i.e., polymer member 542) disposed for shock mitigation. According to an embodiment, the at least one functional member 543 may include a heat dissipation sheet (e.g., a graphite sheet) for dissipating heat, an added display, a force-touch FPCB, a fingerprint sensor FPCB, an antenna radiator for communication, a conductive/non-conductive tape, or an open cell sponge. According to an embodiment, the conductive member 544 is a metal plate, which may help to reinforce the rigidity of the electronic device (e.g., the electronic device 300 in FIG. 3), shield ambient noise, and dissipate heat emitted from nearby heat-generating components. According to an embodiment, the conductive member 544 may include Cu, Al, SUS, or a clad (e.g., a stack member in which SUS and Al are alternately disposed).

According to various embodiments, the digitizer 545 may include a plurality of conductive patterns (e.g., the plurality of conductive patterns 462 and 463 in FIG. 4) stacked in a dielectric sheet (e.g., the dielectric sheet 461 in FIG. 4) based on the above-described embodiments of the disclosure. Because the stacked structure of the digitizer 545 is substantially the same as that of the digitizer 460 in FIGS. 4, 5, and 6, a detailed description thereof is omitted. In some embodiments, the digitizer 545 may be disposed between the at least one polymer member 542 and the functional member 543. In some embodiments, the digitizer 545 may be disposed between the display panel 531 and the at least one polymer member 541. In some embodiments, the digitizer 545 may be disposed on the rear surface of the conductive member 544. In this case, the conductive member 544 may include a structure (e.g., a plurality of openings) for a detection function of the digitizer.

According to various embodiments, the additional layer 540 may have openings 5411, 5421, 5451, and 5441 formed at positions corresponding to a camera module (e.g., the camera module 205 in FIG. 8A). According to an embodiment, the camera module (e.g., the camera module 205 in FIG. 8A) may be disposed to be adjacent to the rear surface of the display panel 531 through the openings 5411, 5421, 5451, and 5441. According to an embodiment, the POL 532 or the touch panel 533 disposed above the display panel 531 may also have openings 5321 and 5331 perforated at corresponding positions so as to prevent the performance degradation of the camera module (e.g., the camera module 205 in FIG. 8A) due to refractive index. According to some embodiments, in the POL 532 and/or the touch panel 533, a position corresponding to the camera module (e.g., the camera module 205 in FIG. 8A) may be processed to be transparent, or a polarization characteristic may be removed. In some embodiments, layers having no opening (e.g., the display panel 531) and/or the touch panel 533 may include a coating layer capable of index matching to minimize a refractive index difference. According to an embodiment, the display 500 may include an unbreakable (UB) type OLED display (e.g., a curved display) or a liquid crystal display (LCD).

Figure 10:
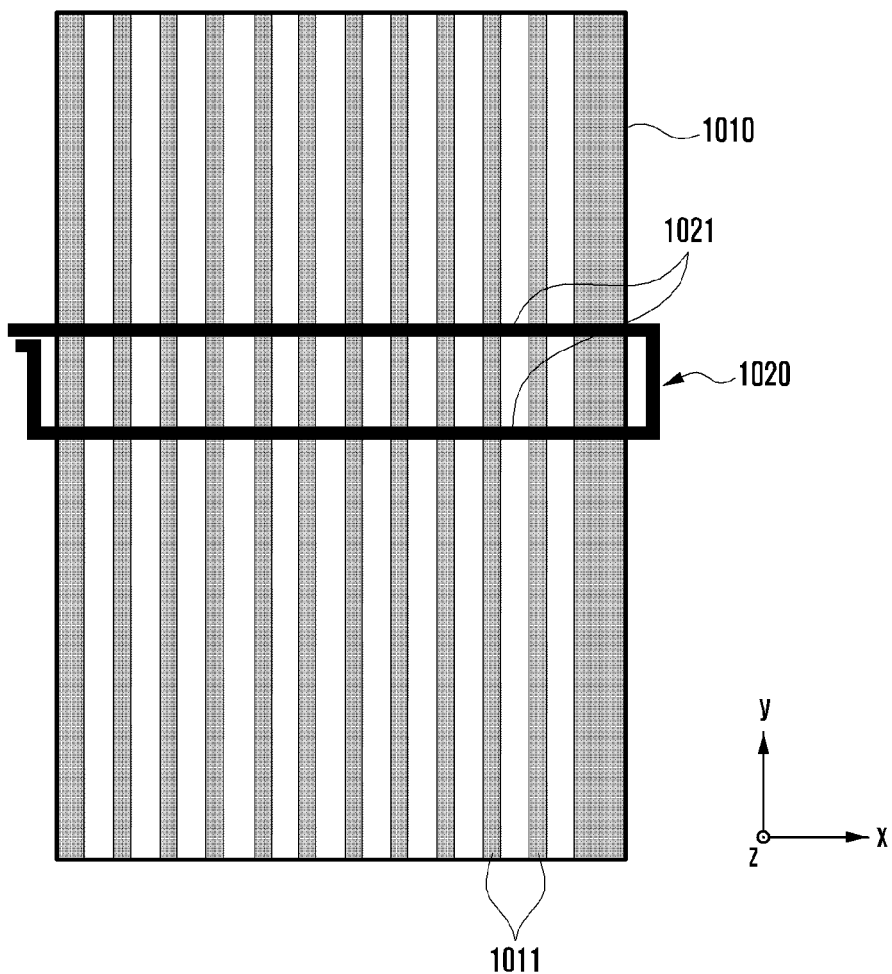
FIG. 10 is a diagram schematically illustrating an arrangement relationship between a display and a conductive pattern according to an embodiment of the disclosure.

FIG. 10 is a diagram schematically illustrating an arrangement relationship between a display and a conductive pattern according to an embodiment of the disclosure.

According to various embodiments, when the digitizer is placed under the display panel and then modularized, a display driving signal may be introduced and thereby affect the performance of the digitizer, or the digitizer driving signal may be introduced into a source line of the display panel and thereby affect the operation of the corresponding device. In particular, when the Tx channel (e.g., the driving channel) of the digitizer is disposed to have a length in the same direction as the source line of the display panel, noise may be introduced into the display panel and thereby cause defects such as flicker. In order to reduce this problem, it may be advantageous to set the source line of the display panel and the Tx channel of the digitizer in different directions.

Referring to FIG. 10, the source line 1011 of the display panel 1010 (e.g., the display panel 430 in FIG. 3 or the display panel 531 in FIG. 9) may be arranged to have a length in a first direction (e.g., the y-axis direction). In this case, the conductive pattern 1021 (e.g., the plurality of second conductive patterns 463 in FIG. 4) used in the Tx channel of the digitizer 1020 (e.g., the digitizer 460 in FIG. 3 or the digitizer 545 in FIG. 9) may be arranged to have a length in a second direction (e.g., the x-axis direction) perpendicular to the first direction (e.g., the y-axis direction), and thereby the mutual interference between the source line 1011 and the conductive pattern 1021 used as the Tx channel may be minimized.

According to various embodiments, the above-described stack structure of the digitizer is applied to a foldable electronic device or a bar-type electronic device and may also be applied to at least one of a rollable electronic device, a slidable electronic device, a multi-foldable electronic device, or a stretchable electronic device.

According to various embodiments, an electronic device (e.g., the electronic device 100 in FIG. 1A or the electronic device 200 in FIG. 8A) may include at least one housing (e.g., the first housing 110 and the second housing 120 in FIG. 1A or the housing 210 in FIG. 8A), a display panel (e.g., the display panel 430 in FIG. 6 or the display panel 531 in FIG. 9) disposed to be visible at least in part from an outside in an inner space of the at least one housing, and a digitizer (e.g., the digitizer 460 in FIG. 6, the digitizer 545 in FIG. 9, or the digitizer 1020 in FIG. 10) disposed under the display panel. The digitizer may include a dielectric sheet (e.g., the dielectric sheet 461 in FIG. 6) including a plurality of layers, a plurality of first conductive patterns (e.g., the plurality of first conductive patterns 462 in FIG. 6) disposed in a first layer (e.g., the first layer 4612 in FIG. 6) of the dielectric sheet and arranged at a predetermined interval to have a length in a first direction (e.g., the x-axis direction in FIG. 6), and a plurality of second conductive patterns (e.g., the plurality of second conductive patterns 463 in FIG. 6) disposed in a second layer (e.g., the second layer 4613 in FIG. 6) of the dielectric sheet different from the first layer and arranged at a predetermined interval to have a length in a second direction (e.g., the y-axis direction in FIG. 6) different from the first direction. A thickness (e.g., the second thickness T2 in FIG. 6) of the plurality of second conductive patterns may be greater than a thickness (e.g., the first thickness T1 in FIG. 6) of the plurality of first conductive patterns.

According to various embodiments, the plurality of second conductive patterns may be used as Tx channels of the digitizer.

According to various embodiments, the plurality of first conductive patterns and the plurality of second conductive patterns may be used as Rx channels of the digitizer.

According to various embodiments, the first layer may be disposed between the display panel and the second layer.

According to various embodiments, the digitizer may further include an insulating layer disposed between the first layer and the second layer.

According to various embodiments, the digitizer may include a first coverlay stacked on the first layer through a first adhesive layer, and a thickness of the first adhesive layer may be at least 80% or more of the thickness of the plurality of first conductive patterns.

According to various embodiments, the digitizer may include a second coverlay stacked under the second layer through a second adhesive layer, and a thickness of the second adhesive layer may be at least 80% or more of the thickness of the plurality of second conductive patterns.

According to various embodiments, the plurality of first conductive patterns may be arranged to be perpendicular to the plurality of second conductive patterns when the digitizer is viewed from above.

According to various embodiments, the display panel may include a source line (e.g., the source line 1011 in FIG. 10) arranged to have a length in the first direction, and the plurality of second conductive patterns may be arranged to have a length in the second direction perpendicular to the first direction when the digitizer is viewed from above.

According to various embodiments, the at least one housing may include a first housing and a second housing foldably combined with the first housing through a hinge device, and the display panel and the digitizer may be disposed to correspond to at least a portion of the first housing and at least a portion of the second housing.

According to various embodiments, the electronic device may include a polymer member disposed between the display panel and the digitizer, and a support plate disposed between the polymer member and the digitizer, and the support plate may be formed of a non-metallic thin plate material.

According to various embodiments, the support plate may include fiber reinforced plastics (FRP).

According to various embodiments, the electronic device may include a polymer member disposed between the display panel and the digitizer.

According to various embodiments, a digitizer (e.g., the digitizer 460 in FIG. 6, the digitizer 545 in FIG. 9, or the digitizer 1020 in FIG. 10) may include a dielectric sheet (e.g., the dielectric sheet 461 in FIG. 6) including a plurality of layers, a plurality of first conductive patterns (e.g., the plurality of first conductive patterns 462 in FIG. 6) disposed in a first layer (e.g., the first layer 4612 in FIG. 6) of the dielectric sheet and arranged at a predetermined interval to have a length in a first direction (e.g., the x-axis direction in FIG. 6), and a plurality of second conductive patterns (e.g., the plurality of second conductive patterns 463 in FIG. 6) disposed in a second layer (e.g., the second layer 4613 in FIG. 6) of the dielectric sheet different from the first layer and arranged at a predetermined interval to have a length in a second direction (e.g., the y-axis direction in FIG. 6) different from the first direction. A thickness (e.g., the second thickness T2 in FIG. 6) of the plurality of second conductive patterns may be greater than a thickness (e.g., the first thickness T1 in FIG. 6) of the plurality of first conductive patterns.

According to various embodiments, the plurality of second conductive patterns may be used as Tx channels of the digitizer.

According to various embodiments, the plurality of first conductive patterns and the plurality of second conductive patterns may be used as Rx channels of the digitizer.

According to various embodiments, the digitizer may be disposed under a display panel in an inner space of an electronic device, and the first layer may be disposed between the display panel and the second layer.

According to various embodiments, the digitizer may further include an insulating layer disposed between the first layer and the second layer.

According to various embodiments, the plurality of first conductive patterns may be arranged to be perpendicular to the plurality of second conductive patterns when the digitizer is viewed from above.

According to various embodiments, the display panel may include a source line arranged to have a length in the first direction, and the plurality of second conductive patterns may be arranged to have a length in the second direction perpendicular to the first direction when the digitizer is viewed from above.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first housing;
a second housing foldably combined with the first housing through a hinge device;
a display panel disposed to be supported by the first housing and the second housing; and
a digitizer disposed under the display panel, the digitizer comprising a first digitizer disposed at a position corresponding to the first housing and a second digitizer disposed at a position corresponding to the second housing,
wherein each of the first digitizer and the second digitizer comprises:
a dielectric sheet,
a plurality of first conductive patterns disposed in a first layer of the dielectric sheet and arranged at a predetermined interval to have a length in a first direction, and
a plurality of second conductive patterns disposed in a second layer of the dielectric sheet different from the first layer and arranged at a predetermined interval to have a length in a second direction different from the first direction,
wherein a thickness of the plurality of second conductive patterns is relatively thicker than that of the plurality of first conductive patterns,
wherein the plurality of second conductive patterns are used as Tx channels of the digitizer,
wherein the plurality of second conductive patterns are disposed at a position farther from the display panel than the plurality of first conductive patterns,
wherein the digitizer includes a connector portion electrically connected to the plurality of first conductive patterns and the plurality of second conductive patterns, the connector portion being extended outwardly from the dielectric sheet,
wherein the connector portion is electrically connected to a substrate in the electronic device,
wherein a plurality of first channels are formed through the plurality of first conductive patterns and a plurality of second channels are formed through the plurality of second conductive patterns,
wherein each of the plurality of first channels includes a first conductive line and a second conductive line spaced apart from the first conductive line,
wherein one end of the first conductive line and one end of the second conductive line are electrically connected to each other via a first sub-line disposed on the second layer,
wherein each of the plurality of second channels includes a third conductive line and a fourth conductive line spaced apart from the third conductive line, and
wherein one end of the third conductive line and one end of the fourth conductive line are electrically connected to each other via a second sub-line disposed on the first layer.

2. The electronic device of claim 1, wherein the plurality of first conductive patterns and the plurality of second conductive patterns are used as Rx channels of the digitizer.

3. The electronic device of claim 1, wherein the first layer is disposed between the display panel and the second layer.

4. The electronic device of claim 1, wherein the digitizer further comprises an insulating layer disposed between the first layer and the second layer.

5. The electronic device of claim 1,
wherein the digitizer comprises a first coverlay stacked on the first layer through a first adhesive layer, and
wherein a thickness of the first adhesive layer is at least 80% or more of the thickness of the plurality of first conductive patterns.

6. The electronic device of claim 1,
wherein the digitizer comprises a second coverlay stacked under the second layer through a second adhesive layer, and
wherein a thickness of the second adhesive layer is at least 80% or more of the thickness of the plurality of second conductive patterns.

7. The electronic device of claim 1, wherein the plurality of first conductive patterns are arranged to be perpendicular to the plurality of second conductive patterns when the digitizer is viewed from above.

8. The electronic device of claim 1,
wherein the display panel comprises a source line arranged to have a length in the first direction, and
wherein the plurality of second conductive patterns are arranged to have a length in the second direction perpendicular to the first direction when the digitizer is viewed from above.

9. The electronic device of claim 1, further comprising:
a polymer member disposed between the display panel and the digitizer; and
a support plate disposed between the polymer member and the digitizer,
wherein the support plate is formed of a non-metallic thin plate material.

10. The electronic device of claim 9, wherein the support plate comprises fiber reinforced plastics (FRP).

11. The electronic device of claim 1, further comprising:
a polymer member disposed between the display panel and the digitizer.

12. A digitizer comprising:
a first digitizer disposed at a position corresponding to a first housing of an electronic device; and
a second digitizer disposed at a position corresponding to a second housing of the electronic device, wherein the second housing is foldably combined with the first housing through a hinge device;
wherein each of the first digitizer and the second digitizer comprises:
a dielectric sheet;
a plurality of first conductive patterns disposed in a first layer of the dielectric sheet and arranged at a predetermined interval to have a length in a first direction; and
a plurality of second conductive patterns disposed in a second layer of the dielectric sheet different from the first layer and arranged at a predetermined interval to have a length in a second direction different from the first direction,
wherein a thickness of the plurality of second conductive patterns is relatively thicker than that of the plurality of first conductive patterns,
wherein the plurality of second conductive patterns are used as Tx channels of the digitizer,
wherein the plurality of second conductive patterns are disposed at a position farther from a display panel than the plurality of first conductive patterns,
wherein the digitizer includes a connector portion electrically connected to the plurality of first conductive patterns and the plurality of second conductive patterns and extends outwardly from the dielectric sheet,
wherein the connector portion is electrically connected to a substrate in the electronic device,
wherein a plurality of first channels is formed through the plurality of first conductive patterns and a plurality of second channels is formed through the plurality of second conductive patterns,
wherein each of the plurality of first channels includes a first conductive line and a second conductive line spaced apart from the first conductive line in the first direction, the first conductive line and the second conductive line being connected at both ends through a first sub-line and a second sub-line disposed in the second layer, and
wherein each of the plurality of second channels includes a third conductive line and a fourth conductive line spaced apart from the third conductive line in the second direction, the third conductive line and the fourth conductive line being connected at both ends through a third sub-line and a fourth sub-line disposed in the first layer.

13. The digitizer of claim 12, wherein the plurality of first conductive patterns and the plurality of second conductive patterns are used as Rx channels of the digitizer.

14. The digitizer of claim 12,
wherein the digitizer is disposed under the display panel disposed to be supported by the first housing and the second housing, and
wherein the first layer is disposed between the display panel and the second layer.

15. The digitizer of claim 12, further comprising:
an insulating layer disposed between the first layer and the second layer.

16. The digitizer of claim 12, wherein the plurality of first conductive patterns are arranged to be perpendicular to the plurality of second conductive patterns when the digitizer is viewed from above.

17. The digitizer of claim 12, further comprising:
wherein the display panel comprises a source line arranged to have a length in the first direction, and
wherein the plurality of second conductive patterns are arranged to have a length in the second direction perpendicular to the first direction when the digitizer is viewed from above.

* * * * *